United States Patent
Tan et al.

(10) Patent No.: US 8,169,804 B2
(45) Date of Patent: May 1, 2012

(54) THREE-PHASE BUCK-BOOST POWER FACTOR CORRECTION CIRCUIT AND CONTROLLING METHOD THEREOF

(75) Inventors: Jingtao Tan, Shanghai (CN); Yang Li, Shanghai (CN); Zhijian Zhou, Shanghai (CN); Shichao Yan, Shanghai (CN); Wen-Yin Tasi, Taoyuan Hsien (TW); Jianping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 433 days.

(21) Appl. No.: 12/429,465

(22) Filed: Apr. 24, 2009

(65) Prior Publication Data

US 2009/0268496 A1    Oct. 29, 2009

(30) Foreign Application Priority Data

Apr. 25, 2008   (TW) .............................. 97115475 A

(51) Int. Cl.
*H02J 1/10*    (2006.01)

(52) U.S. Cl. ........................................................ 363/65

(58) Field of Classification Search .................... 363/65, 363/67, 69, 148, 150
See application file for complete search history.

(56) References Cited

U.S. PATENT DOCUMENTS

| | | | | |
|---|---|---|---|---|
| 5,208,740 A | * | 5/1993 | Ehsani | 363/124 |
| 7,315,151 B2 | * | 1/2008 | Thompson et al. | 323/223 |
| 2009/0303762 A1 | * | 12/2009 | Jang et al. | 363/61 |

FOREIGN PATENT DOCUMENTS

CN            1909346 A        2/2007

OTHER PUBLICATIONS

Li et al. "Power Factor Correction of Buck-Boost Rectifier" Journal of Shanghai Jiaotung University vol. 33, No. 12 (Dec. 1999) (pp. 8-9) *English Translation of Abstract Only.

* cited by examiner

*Primary Examiner* — Matthew Nguyen
(74) *Attorney, Agent, or Firm* — Volpe and Koenig P.C.

(57) ABSTRACT

The configurations of a three-phase buck-boost power factor correction (PFC) circuit are provided. The circuit includes a first single-phase buck-boost PFC circuit receiving a first phase voltage and having a first and a second output terminals and a neutral-point for outputting a first and a second output voltages, a second single-phase buck-boost PFC circuit receiving a third phase voltage and coupled to the first and the second output terminals and the neutral-point, a first to a fourth thyristors, each of which has an anode and a cathode. The anodes of the first and the third thyristors and the cathodes of the second and the fourth thyristors receive a second phase voltage, and the cathode of the first thyristor and the anode of the second thyristor are coupled to the first single-phase buck-boost PFC circuit.

4 Claims, 23 Drawing Sheets

THREE-PHASE BUCK-BOOST POWER FACTOR CORRECTION CIRCUIT AND CONTROLLING METHOD THEREOF

FIELD OF THE INVENTION

The present invention relates to a three-phase buck-boost power factor correction (PFC) circuit and a controlling method thereof. More particularly, it relates to a three-phase buck-boost PFC circuit employing three independent single-phase three-level buck-boost PFC circuits to improve the total harmonic distortion (THD) of the three-phase buck-boost PFC circuit and to increase the efficiency of the same.

BACKGROUND OF THE INVENTION

In the recent twenty years, the power electronic technology has obtained a quickly development, and has been widely applied to the fields of electrical power, chemical engineering and communications. The electrical power apparatuses are mostly going through the rectifiers and the electrical power network interfaces, a typical rectifier is a nonlinear circuit including diodes or thyristors, and the nonlinear circuit generates lots of current harmonics and reactive powers in the electrical power network, pollutes the electrical power network, and becomes a public nuisance of the electrical power. The electrical power apparatuses have become the main harmonic sources of the electrical power network. The main method to restrain the harmonics is the active approach, i.e. designing a new generation of high-performance rectifiers with features of having sinusoidal input current, containing low amount of harmonics and having high power factor, namely, it has the power factor correction function. Recently, the PFC circuits have attained a great development, and have become an important research direction of the power electronics.

The single-phase PFC technology currently approaches increasingly mature in circuit topology and in control, and the frequently used single-phase PFC circuit is the boost circuit. It has the advantages of having simple configuration, requiring smaller EMI filter etc. But this kind of configuration could only apply to the occasions while the output voltage is larger than the peak value of the input voltage. For the input voltage having a broad range, sometimes the input voltage is higher than the output voltage, namely the input voltage needs to be decreased and guaranteed that the input current tracks the input voltage nicely so as to gain a lower THD. At the moment, the boost circuit could not accomplish this function, and a buck configuration is used for this occasion. As shown in FIG. 1, it is a topology of a single-phase buck-boost PFC circuit applied to a broad range of input voltage in the prior art. It has diodes B1-B4 and D1-D2, switches S1-S2, inductor L1, input power source Vin and output capacitor C1, and outputs a voltage Vo.

The working modes of this kind of conversion circuit are as follows:

$$V_o > \sqrt{2} V_{in} \qquad \text{a.}$$

Wherein, Vo is the output voltage, and Vin is the input voltage. Under this kind of operation conditions, a waveform diagram of the input voltage Vin and the output voltage Vo is shown in FIG. 2, the output voltage is always higher than the input voltage, the converter must operate under the boost mode, switch S1 is turned on, diode D1 is turned off, and under this circumstances, the converter is the conventional boost PFC circuit.

$$V_o \leq \sqrt{2} V_{in} \qquad \text{b.}$$

It is easy to find from FIG. 3, the converter operates under the buck and the boost working modes. Between periods π−α and π+α, the output voltage is larger than the input voltage, switch S1 is always turned on, D1 is always turned off, and the converter works under the boost mode. Between periods α and π−α, the output voltage is smaller than the input voltage, switch S2 is always turned off, D2 is always turned on, and the converter works under the buck mode.

This kind of circuit is only suitable for the condition of single-phase input, for certain occasions, we need to use the three-phase input voltage, and thus this kind of single-phase circuit could not fulfill the requirements of the system. In the three-phase input voltage application occasions, there are many other conventional methods used to decrease the THD of the input current. A relatively frequently used method is shown in FIG. 4. In which, it includes diodes, D1-D14, capacitor Co and C1-C3, switches S1-S4, inductors L1-L5 and AC power sources Vi1-Vi3.

The topology of FIG. 4 could be divided into two parts: the front part is the input buck part (buck input stage), and the rear part is the output boost part (boost output stage). This PFC circuit could be employed in rectification for the three-phase three-line configuration, has a simple configuration, and has relatively less elements. But it also has drawbacks: due to that the neutral point of the three-phase three-line configuration is formed by the three-phase AC input voltage connecting to three capacitors, which is not the absolute zero potential point, in the three-phase three-line condition, the three-phase inputs are coupled to each other, thus the three-phase current control is relatively harder and the THD is relatively higher. This kind of topology has a lower efficiency due to that the current flows through a higher amount of elements. Especially, due to that the three-phase inputs are electrically coupled, this system can not be parallel-connected unless a transformer is used for isolation. However, if it is parallel-connected, the current of one phase will become a reverse-current of another phase, which will result in unbalance among circuit currents of different phases, and it is difficult to make redundant system with high reliability.

Keeping the drawbacks of the prior arts in mind, and employing experiments and research full-heartily and persistently, the applicant finally conceived a three-phase buck-boost PFC circuit and a controlling method thereof.

SUMMARY OF THE INVENTION

It is therefore an object of the present invention to provide a three-phase buck-boost PFC circuit and a controlling method thereof, this circuit includes three independent single-phase three-level buck-boost PFC circuit, the first, the second and the third single-phase three-level buck-boost PFC circuits would not influence each other due to having a neutral line, operate independently from each other, could be used to improve the THD of the three-phase buck-boost PFC circuit and to increase the efficiency of the same. The three-phase buck-boost PFC circuit provided by the present invention relatively has the higher efficiency, decreases the quantity of elements, raises the utilization ratio of elements and the power density of the system at the same time, and decrease costs of the system. Besides, it has the advantages of being easy to accomplish the parallel-connected system, and the integrated circuit of the PFC circuit and the DC/DC converter, and it is especially suitable for the UPS due to that each phase current is independently controlled.

According to the first aspect of the present invention, a three-phase buck-boost power factor correction (PFC) circuit includes a first single-phase buck-boost PFC circuit receiving a first phase voltage of a three-phase voltage and having a first and a second output terminals and a neutral-point for outputting a first and a second output voltages, a second single-phase buck-boost PFC circuit receiving a third phase voltage of the three-phase voltage and coupled to the first and the second output terminals and the neutral-point, a first to a fourth thyristors, each of which has an anode and a cathode, wherein the anodes of the first and the third thyristors and the cathodes of the second and the fourth thyristors receive a second phase voltage of the three-phase voltage, the cathode of the first thyristor and the anode of the second thyristor are coupled to the first single-phase buck-boost PFC circuit, and the cathode of the third thyristor and the anode of the fourth thyristor are coupled to the second single-phase buck-boost PFC circuit, a first output capacitor coupled to the first output terminal and the neutral-point, a second output capacitor coupled to the neutral-point and the second output terminal and a neutral line coupled to the neutral-point.

Preferably, each of the first and the second single-phase buck-boost PFC circuits is a single-phase three-level buck-boost PFC circuit, and each the single-phase three-level buck-boost PFC circuit further includes a first to a sixth diodes, each of which has an anode and a cathode, wherein the first and the second diodes are used in rectification, the anode of the first diode is coupled to the cathode of the second diode, and the cathode of the fourth diode is coupled to the anode of the third diode, a first to a fourth switches, each of which has a first and a second terminals, wherein the first terminal of the first switch is coupled to the cathode of the third diode, the second terminal of the first switch is coupled to the cathode of the first diode, the first terminal of the second switch is coupled to the anode of the second diode, the second terminal of the second switch is coupled to the anode of the fourth diode, the first terminal of the third switch is coupled to the cathode of the fourth diode, the second terminal of the third switch is coupled to the anode of the fifth diode, the first terminal of the fourth switch is coupled to the cathode of the sixth diode, the second terminal of the fourth switch is coupled to the first terminal of the third switch, the cathode of the fifth diode is coupled to the first output terminal, the anode of the sixth diode is coupled to the second output terminal, and the neutral point is coupled to the first terminal of the third switch and a first and a second inductors, each of which has a first and a second terminals, wherein the first terminal of the first inductor is coupled to the cathode of the third diode, the second terminal of the first inductor is coupled to the second terminal of the third switch, the first terminal of the second inductor is coupled to the anode of the fourth diode, and the second terminal of the second inductor is coupled to the first terminal of the fourth switch.

Preferably, the circuit further includes a first to a third input capacitors, wherein each the input capacitor and the neutral line have a first and a second terminals, the second terminal of the neutral line is coupled to the neutral point, the first terminal of the first input capacitor receives the first phase voltage, the second terminal of the first input capacitor is coupled to the first terminal of the neutral line, the first terminal of the second input capacitor receives the second phase voltage, the second terminal of the second input capacitor is coupled to the second terminal of the first input capacitor, the first terminal of the third input capacitor receives the third phase voltage, and the second terminal of the third input capacitor is coupled to the second terminal of the second input capacitor.

Preferably, the circuit further includes a fifth to a eighth thyristors and a first and a second batteries, wherein each the thyristor has an anode and a cathode, each the battery has a positive and a negative terminals, the neutral line has a first and a second terminals, the second terminal of the neutral line is coupled to the neutral point, the anodes of the fifth and the sixth thyristors are coupled to the positive terminal of the first battery, the cathodes of the fifth and the sixth thyristors are respectively coupled to the cathodes of the first diodes of the first and the second single-phase buck-boost PFC circuits, the positive terminal of the second battery is coupled to the negative terminal of the first battery, the cathodes of the seventh and the eighth thyristors are coupled to the negative terminal of the second battery, the anodes of the seventh to the eighth thyristors are respectively coupled to the anodes of the second diodes of the second and the first single-phase buck-boost PFC circuits, and the positive terminal of the second battery is coupled to the first terminal of the neutral line.

According to the second aspect of the present invention, a three-phase buck-boost power factor correction (PFC) circuit includes a first single-phase buck-boost PFC circuit receiving a first phase voltage of a three-phase voltage and having a first and a second output terminals and a neutral-point for outputting a first and a second output voltages, a second single-phase buck-boost PFC circuit receiving a second phase voltage of the three-phase voltage and coupled to the first and the second output terminals and the neutral-point, a third single-phase buck-boost PFC circuit receiving a third phase voltage of the three-phase voltage and coupled to the first and the second output terminals and the neutral-point, a first output capacitor coupled to the first output terminal and the neutral-point, a second output capacitor coupled to the neutral-point and the second output terminal and a neutral line coupled to the neutral-point.

Preferably, the first, the second and the third phase voltages are a phase A, a phase B and a phase C voltages respectively, and the first and the second output voltages have a positive voltage and a negative voltage values respectively.

Preferably, each the single-phase buck-boost PFC circuit is a single-phase three-level buck-boost PFC circuit and further includes a first to a sixth diodes, each of which has an anode and a cathode, wherein the first and the second diodes are used in rectification, the anode of the first diode is coupled to the cathode of the second diode, and the cathode of the fourth diode is coupled to the anode of the third diode, a first to a fourth switches, each of which has a first and a second terminals, wherein the first terminal of the first switch is coupled to the cathode of the third diode, the second terminal of the first switch is coupled to the cathode of the first diode, the first terminal of the second switch is coupled to the anode of the second diode, the second terminal of the second switch is coupled to the anode of the fourth diode, the first terminal of the third switch is coupled to the cathode of the fourth diode, the second terminal of the third switch is coupled to the anode of the fifth diode, the first terminal of the fourth switch is coupled to the cathode of the sixth diode, the second terminal of the fourth switch is coupled to the first terminal of the third switch, the cathode of the fifth diode is coupled to the first output terminal, the anode of the sixth diode is coupled to the second output terminal, and the neutral point is coupled to the first terminal of the third switch and a first and a second inductors, each of which has a first and a second terminals, wherein the first terminal of the first inductor is coupled to the cathode of the third diode, the second terminal of the first inductor is coupled to the second terminal of the third switch, the first terminal of the second inductor is coupled to the anode of the fourth diode, and the second terminal of the second inductor is coupled to the first terminal of the fourth switch.

Preferably, the circuit further includes a first to a sixth thyristors and a first and a second batteries, wherein each the thyristor has an anode and a cathode, each the battery has a positive and a negative terminals, the neutral line has a first and a second terminals, the second terminal of the neutral line is coupled to the neutral point, the anodes of the first to the third thyristors are coupled to the positive terminal of the first battery, the cathodes of the first to the third thyristors are respectively coupled to the cathodes of the first diodes of the first to the third single-phase buck-boost PFC circuits, the positive terminal of the second battery is coupled to the negative terminal of the first battery, the cathodes of the fourth to the sixth thyristors are coupled to the negative terminal of the second battery, the anodes of the fourth, the fifth and the sixth thyristors are respectively coupled to the anodes of the second diodes of the third, the second and the first single-phase buck-boost PFC circuits, and the positive terminal of the second battery is coupled to the first terminal of the neutral line.

According to the third aspect of the present invention, a controlling method for a three-phase buck-boost power factor correction (PFC) circuit, wherein the circuit includes a first single-phase buck-boost PFC circuit receiving a first phase voltage of a three-phase voltage, includes steps of: causing the first single-phase buck-boost PFC circuit to proceed a boost operation and output an amplitude of a first output voltage accordingly when an amplitude of a positive-half cycle of the first phase voltage is smaller than the amplitude of the first output voltage; causing the first single-phase buck-boost PFC circuit to proceed a buck operation and output the amplitude of the first output voltage accordingly when the amplitude of the positive-half cycle of the first phase voltage is larger than the amplitude of the first output voltage; causing the first single-phase buck-boost PFC circuit to proceed the boost operation and output an amplitude of a second output voltage accordingly when an amplitude of a negative-half cycle of the first phase voltage is smaller than the amplitude of the second output voltage; and causing the first single-phase buck-boost PFC circuit to proceed the buck operation and output the amplitude of the second output voltage accordingly when the amplitude of the negative-half cycle of the first phase voltage is larger than the amplitude of the second output voltage.

Preferably, the circuit further includes a first and a second output terminals, a neutral-point, a neutral line coupled to the neutral point and a second single-phase buck-boost PFC circuit receiving a second phase voltage of the three-phase voltage and coupled to the first and the second output terminals, the neutral-point and the neutral line for outputting the first and the second output voltages, and the method further includes steps of: causing the second single-phase buck-boost PFC circuit to proceed a boost operation and output the amplitude of the first output voltage accordingly when an amplitude of a positive-half cycle of the second phase voltage is smaller than the amplitude of the first output voltage; causing the second single-phase buck-boost PFC circuit to proceed a buck operation and output the amplitude of the first output voltage accordingly when the amplitude of the positive-half cycle of the second phase voltage is larger than the amplitude of the first output voltage; causing the second single-phase buck-boost PFC circuit to proceed the boost operation and output the amplitude of the second output voltage accordingly when an amplitude of a negative-half cycle of the second phase voltage is smaller than the amplitude of the second output voltage; and causing the second single-phase buck-boost PFC circuit to proceed the buck operation and output the amplitude of the second output voltage accordingly when the amplitude of the negative-half cycle of the second phase voltage is larger than the amplitude of the second output voltage.

According to the fourth aspect of the present invention, a three-phase buck-boost power factor correction (PFC) circuit includes a first capacitor having a first voltage output terminal, a second capacitor having a second voltage output terminal and electrically connected to the first capacitor in series at a neutral-point, a neutral line electrically connected to the neutral-point, three PFC converters each receiving a three-phase AC input voltage and outputting a DC output voltage having a predetermined voltage value, wherein the predetermined voltage value is smaller than a peak value of the three-phase AC input voltage, each the PFC converter includes a rectifying bridge rectifying the three-phase AC input voltage and outputting a first and a second rectifying voltages through a first and a second rectifying output terminals respectively, a first buck-boost circuit coupled to the first rectifying output terminal and the neutral line, regulating the first rectifying voltage and outputting the predetermined voltage value to the first voltage output terminal of the first capacitor and a second buck-boost circuit coupled to the second rectifying output terminal and the neutral line, regulating the second rectifying voltage and outputting the predetermined voltage value to the second voltage output terminal of the second capacitor.

Preferably, the circuit further includes a battery apparatus, wherein each the rectifying bridge includes a controllable switch, and the battery apparatus electrically connects to each the rectifying bridge via the corresponding controllable switch and provides an electrical energy when the three-phase AC input voltage is abnormal.

According to the fifth aspect of the present invention, a three-phase buck-boost power factor correction (PFC) circuit includes a first capacitor having a first voltage output terminal, a second capacitor having a second voltage output terminal and electrically connected to the first capacitor in series at a neutral-point, a neutral line electrically connected to the neutral-point, a first and a second PFC converters each receiving a first phase and a second phase AC input voltages, and outputting a predetermined voltage value to the first and the second capacitors, wherein each the PFC converter includes a rectifying bridge rectifying the first phase and the second phase AC input voltages and outputting a first and a second rectifying voltages through a first and a second rectifying output terminals respectively, a first buck-boost circuit coupled to the first rectifying output terminal and the neutral line, regulating the first rectifying voltage and outputting the predetermined voltage value to the first voltage output terminal of the first capacitor and a second buck-boost circuit coupled to the second rectifying output terminal and the neutral line, regulating the second rectifying voltage and outputting the predetermined voltage value to the second voltage output terminal of the second capacitor, wherein each the rectifying bridge includes at least one controllable rectifying switch, the first and the second PFC converters receive a third phase AC input voltage via the corresponding controllable rectifying switch.

According to the sixth aspect of the present invention, a three-phase buck-boost power factor correction (PFC) circuit includes a first single-phase buck-boost PFC circuit, a second single-phase buck-boost PFC circuit, a third single-phase buck-boost PFC circuit and a neutral line electrically coupled to the first, the second and the third single-phase buck-boost PFC circuits.

Preferably, the circuit further includes a first and a second output capacitors, wherein the first single-phase buck-boost PFC circuit receives a first phase voltage of a three-phase voltage and has a first and a second output terminals and a neutral-point for outputting a first and a second output voltages, the second single-phase buck-boost PFC circuit receives a second phase voltage of the three-phase voltage and is coupled to the first and the second output terminals and the neutral-point, the third single-phase buck-boost PFC circuit receives a third phase voltage of the three-phase voltage and is coupled to the first and the second output terminals and the neutral-point, the first output capacitor is coupled to the first output terminal and the neutral-point, the second output capacitor is coupled to the neutral-point and the second output terminal, and the neutral line is coupled to the neutral point.

The present invention may best be understood through the following descriptions with reference to the accompanying drawings, in which:

DETAILED DESCRIPTION OF THE PREFERRED EMBODIMENT

Figure 1:
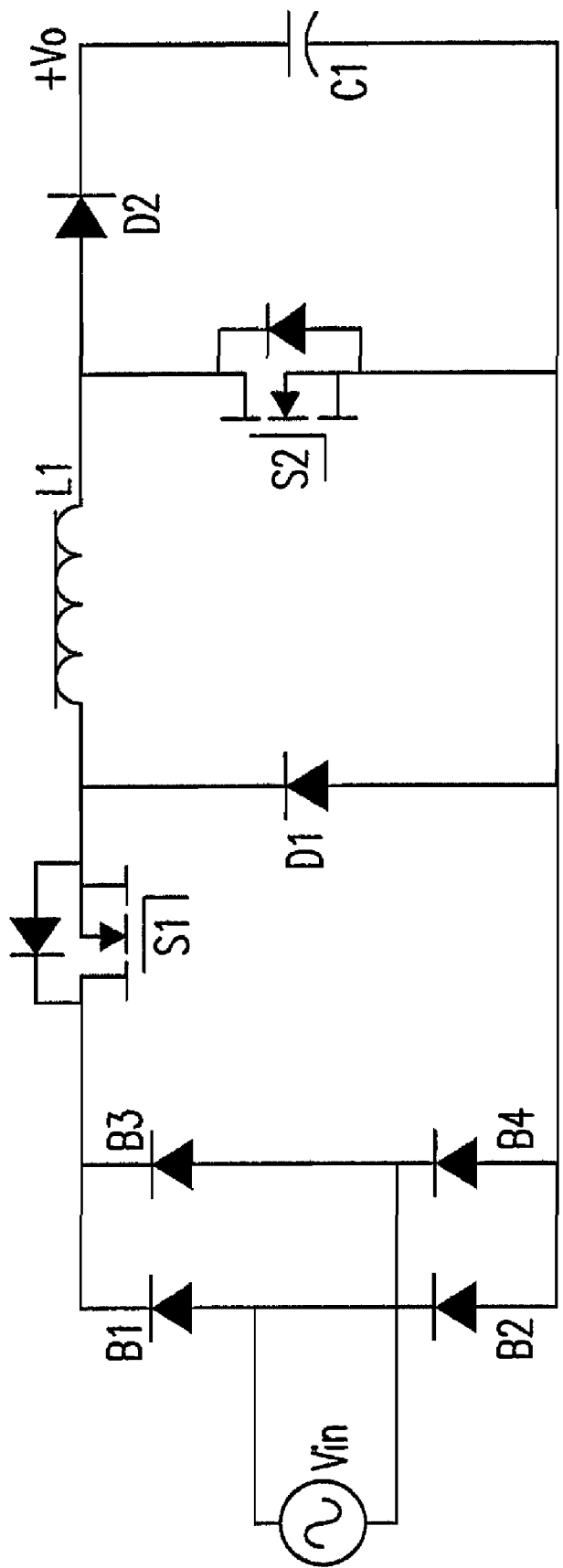
FIG. 1 shows a circuit diagram of a single-phase buck-boost PFC circuit in the prior art.
Figure 2:
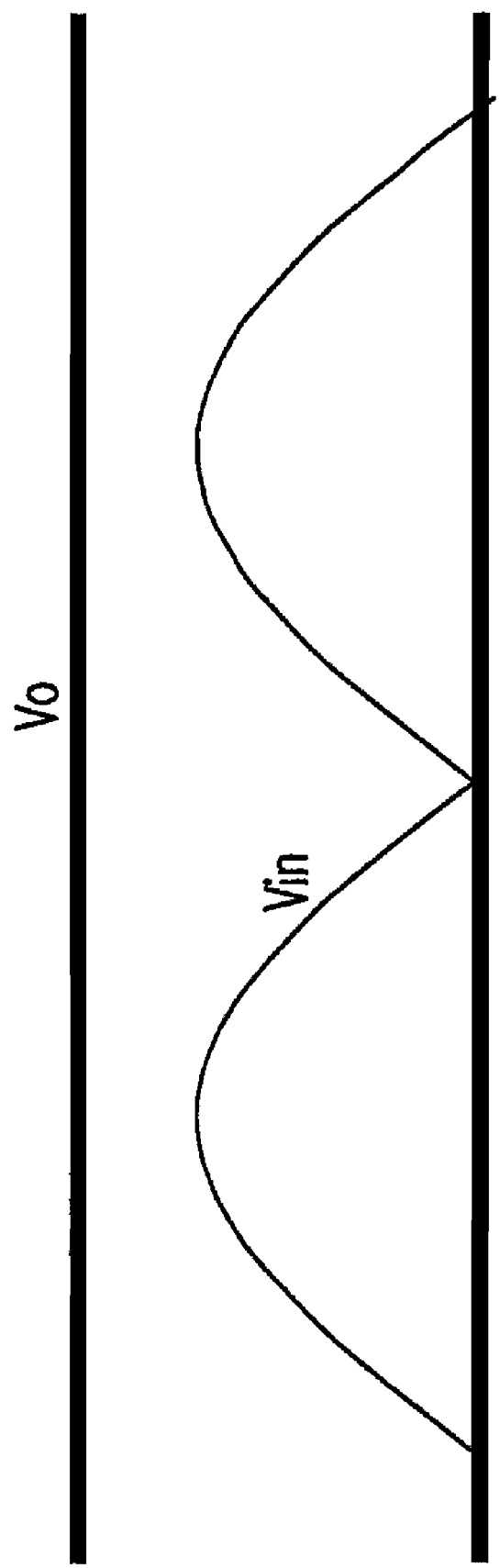
FIG. 2 shows a waveform diagram of an input and an output voltages under a boost operation mode in the prior art.
Figure 3:
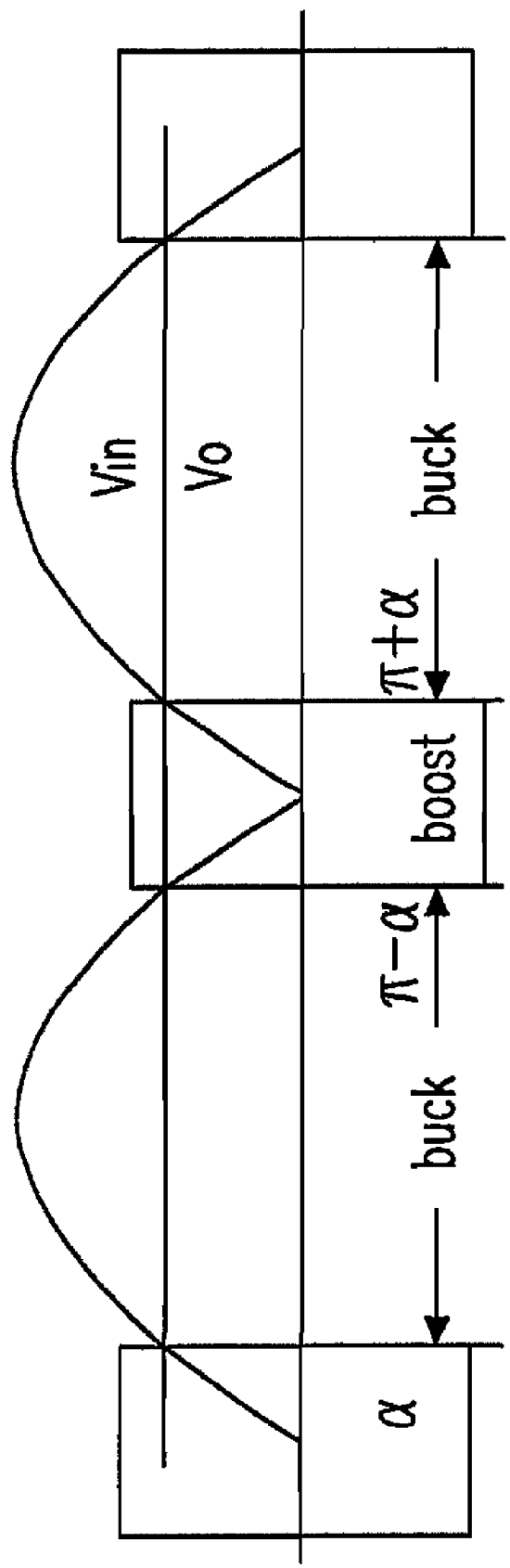
FIG. 3 shows a waveform diagram of an input and an output voltages under a boost and a buck operation modes in the prior art.
Figure 4:
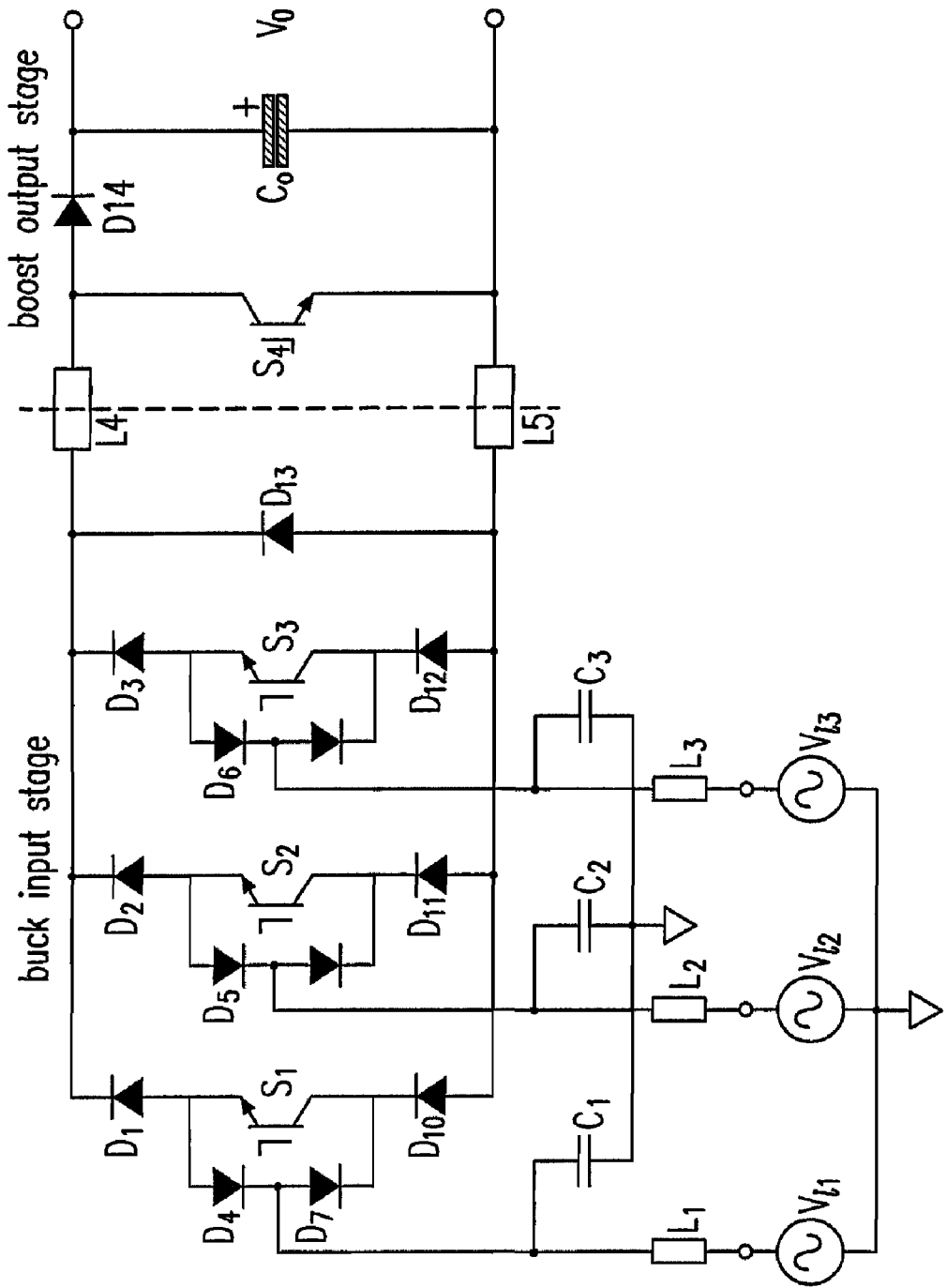
FIG. 4 shows a circuit diagram of a three-phase three-line buck-boost PFC circuit in the prior art.
Figure 5:
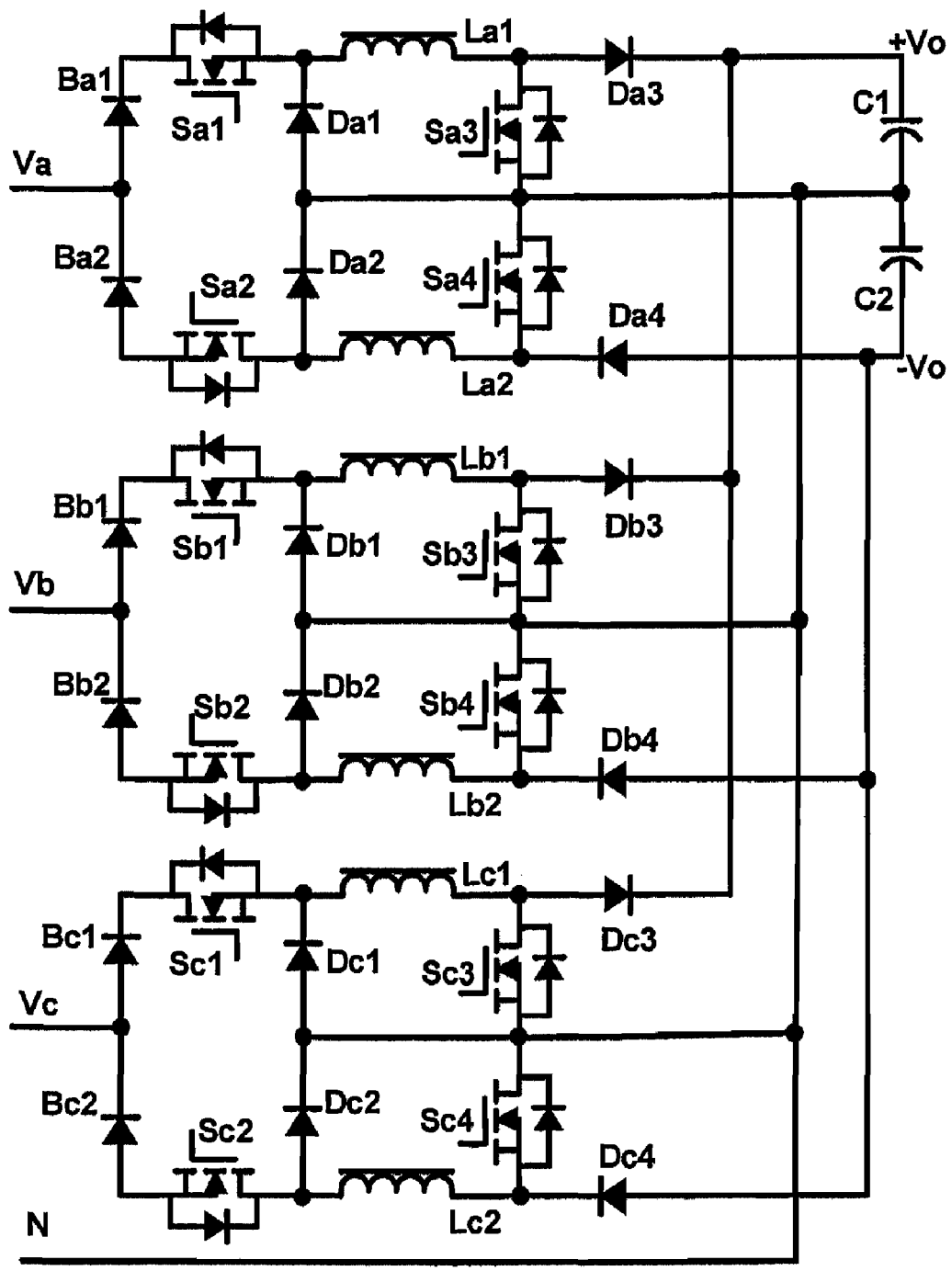
FIG. 5 shows a circuit diagram of a three-phase four-line buck-boost PFC circuit according to the first preferred embodiment of the present invention.

To overcome the drawbacks of the conventional three-phase three-line buck boost PFC circuit, the present invention proposed a three-phase four-line buck-boost PFC circuit (the input power source has a natural neutral point) employing three independent single-phase three-level buck-boost PFC circuits combined to control the three-phase input current as shown in FIG. 5. In which, it has diodes Ba1-Ba2, Bb1-Bb2, Bc1-Bc2, Da1-Da2, Db1-Db2, Dc1-Dc2, Da3-Da4, Db3-Db4 and Dc3-Dc4, switches Sa1-Sa4, Sb1-Sb4 and Sc1-Sc4, inductors La1-La2, Lb1-Lb2 and Lc1-Lc2, capacitors C1-C2 and a neutral line N causing the neutral point of the power source electrically connected to the neutral point of the PFC circuit, and the neutral point of the PFC circuit is the connecting node of the capacitors C1 and C2. And the three-phase four-line buck boost PFC circuit receives a three-phase input voltage having a first phase voltage Va, a second phase voltage Vb and a third phase voltage Vc and generates a first output voltage +Vo and a second output voltage −Vo.

For this kind of circuit, the first, the second and the third single-phase three-level buck-boost PFC circuit would not influence each other due to having a neutral line, and are independent from each other, i.e. the three-phase voltage of phase A voltage, phase B voltage and phase C voltage could operate independently through three modes. Thus, the controlling method is relatively simple, and the THD of the circuit could reach a satisfied effect, and the efficiency could reach a relatively higher level. Due to that the potential of the neutral point of the bus capacitors is constant, and the parallelized control of several modes are easy to achieve. The concrete working principles are described as the following analyses.

Figure 6:
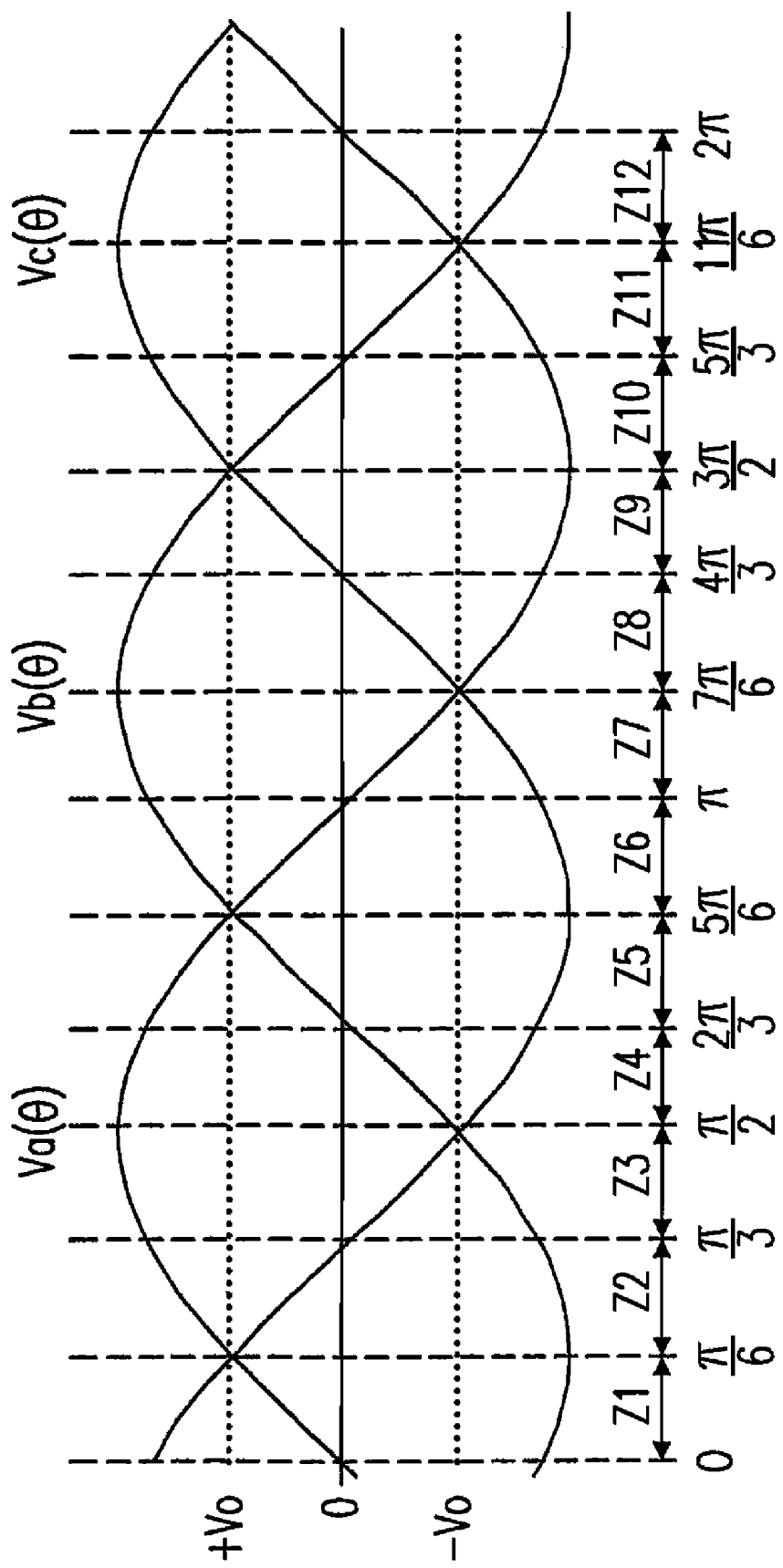
FIG. 6 shows a waveform diagram of a three-phase input voltage in the prior art.

FIG. 6 shows a waveform diagram of a three-phase input voltage in the prior art, here we assume that the amplitude of the output voltage Vo is exactly half the peak value of the input voltage Vin. We divided the above-mentioned FIG. 6 into twelve regions:

$$0 \sim \frac{\pi}{6}, \frac{\pi}{6} \sim \frac{\pi}{3}, \frac{\pi}{3} \sim \frac{\pi}{2}, \frac{\pi}{2} \sim \frac{2\pi}{3}, \frac{2\pi}{3} \sim \frac{5\pi}{6},$$
$$\frac{5\pi}{6} \sim \pi, \pi \sim \frac{7\pi}{6}, \frac{7\pi}{6} \sim \frac{4\pi}{3}, \frac{4\pi}{3} \sim \frac{3\pi}{2}, \frac{3\pi}{2} \sim \frac{5\pi}{3},$$
$$\frac{5\pi}{3} \sim \frac{11\pi}{6} \text{ and } \frac{11\pi}{6} \sim 2\pi.$$

The working principles of the first region are analyzed in detail as follows.

$$0 \sim \frac{\pi}{6} \text{ working region} \qquad (1)$$

Figure 7:
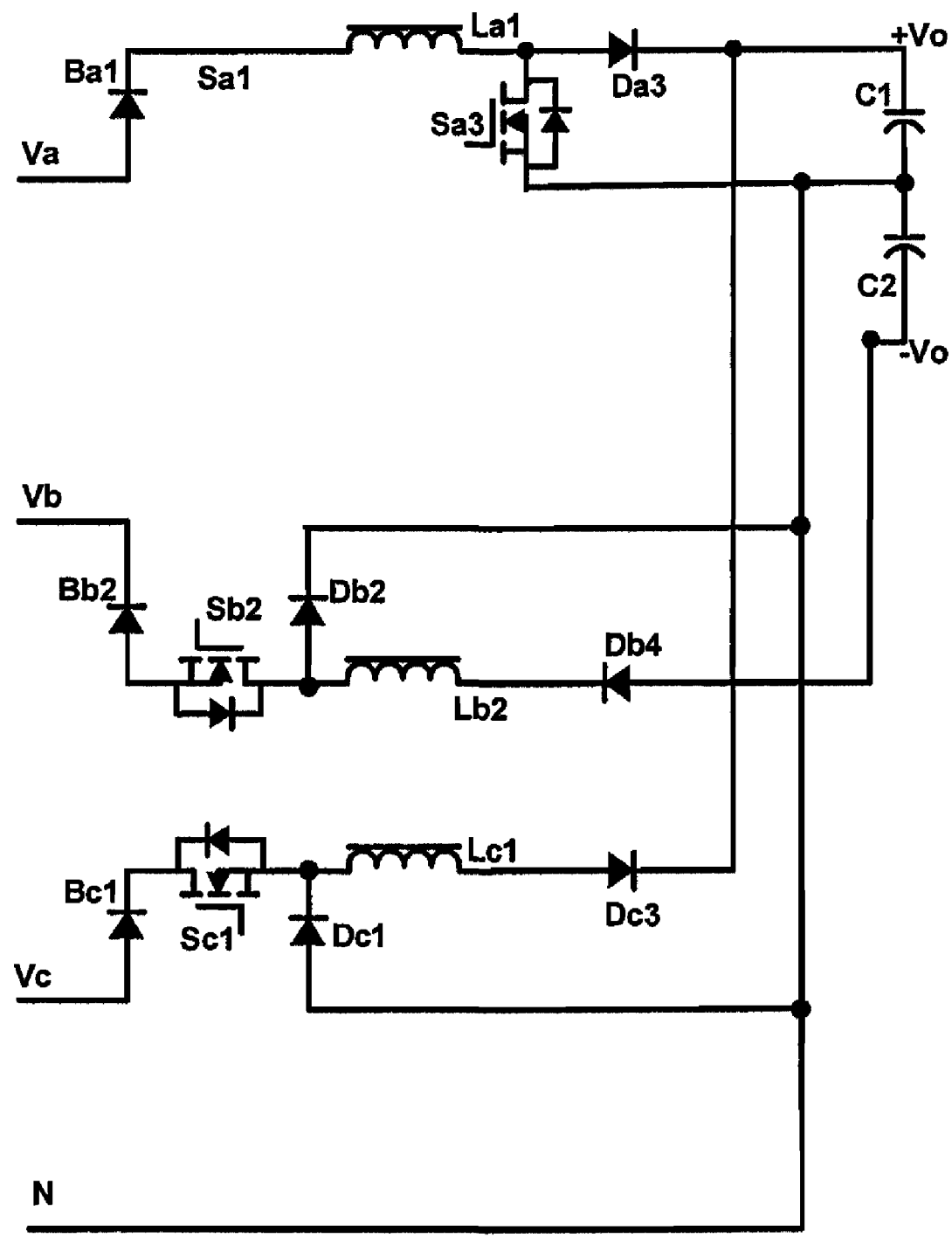
FIG. 7 shows a circuit diagram of the working mode 1 of the three-phase four-line buck-boost PFC circuit according to the first preferred embodiment of the present invention.

The working mode of the first working region is shown in FIG. 7. Phase A voltage is larger than zero and the amplitude of which is smaller than the output voltage in the first region, thus diode Ba1 is turned on, phase A voltage is implemented in the boost mode, switch Sa1 is turned on, diode Da1 is turned off, switch Sa3 is chopping towards the phase A voltage, and inductor La1 is used in charging and discharging of the phase A voltage. When switch Sa3 is turned on, current of phase A flows through sub-circuit of Va->Ba1->Sa1->La1->Sa3->N and charges inductor La1. When switch Sa3 is turned off, current of phase A flows through sub-circuit of Va->Ba1->Sa1->La1->Da3->C1->N and charges capacitor C1. Phase C voltage is larger than zero and the amplitude of which is larger than the output voltage in the first region, thus diode Bc1 is turned on, phase C voltage is implemented in the buck mode, switch Sc3 is turned off, diode Dc3 is turned on, switch Sc1 is chopping against the phase C voltage, and inductor Lc1 is used in charging and discharging of the phase C voltage. When switch Sc1 is turned on, current of phase C flows through sub-circuit of Vc->Bc1->Sc1->Lc1->Dc3->C1->N and charges inductor Lc1. When switch Sc1 is turned off, current of phase C flows through sub-circuit of Dc1->Lc1->Dc3->C1->N, and inductor Lc1 releases energy. Phase B voltage is less than zero and the amplitude of which is larger than the output voltage in the first region, thus current of phase B is implemented in buck mode, diode Bb2 is turned on. When switch Sb2 is turned on, current of phase B flows through sub-circuit of N->C2->Db4->Lb2->Sb2->Bb2->Vb and charges inductor Lb2. When switch Sb2 is turned off, current of phase B flows through sub-circuit of C2->Db4->Lb2->Db2, and inductor Lb2 releases energy.

(2) The working principles of the remaining regions are similar to those of region 1, and would not be described in detail.

Through the above-mentioned analyses, one could know that the present invention could rectify the three-phase input voltage, and there is only one switch is switching during the buck mode or the boost mode, and the switch losses are largely decreased than those of the present technology. And due to that the output voltage is lower than the conventional output voltage, the requirements of the voltage stress on the switch are lower, electronic elements of lower specification can be selected, and at the same time the conduction resistance of the switch having lower voltage stress requirements is smaller and results in a great raise of the whole operational efficiency and a lower input current THD. Due to the existence of the neutral line, the three single-phase three-level buck-boost PFC circuits would not influence each other, are independent from each other, and the controlling method of which are relatively simpler.

An improvement of the present invention

The proposed circuit according to the aforementioned FIG. 5 has drawbacks, i.e. the utilization rate of its elements is lower. Taking phase A as example, diodes Da2 and Da4, and switch Sa2 and Sa4 are not utilized when phase A voltage is positive, and diodes Da1 and Da3, and switches Sa1 and Sa3 are not utilized when phase A voltage is negative. Furthermore, this circuit includes three single-phase buck-boost PFC circuits such that the quantity of employed elements is plenty, the cost is higher, and the power density is lower.

Figure 8:
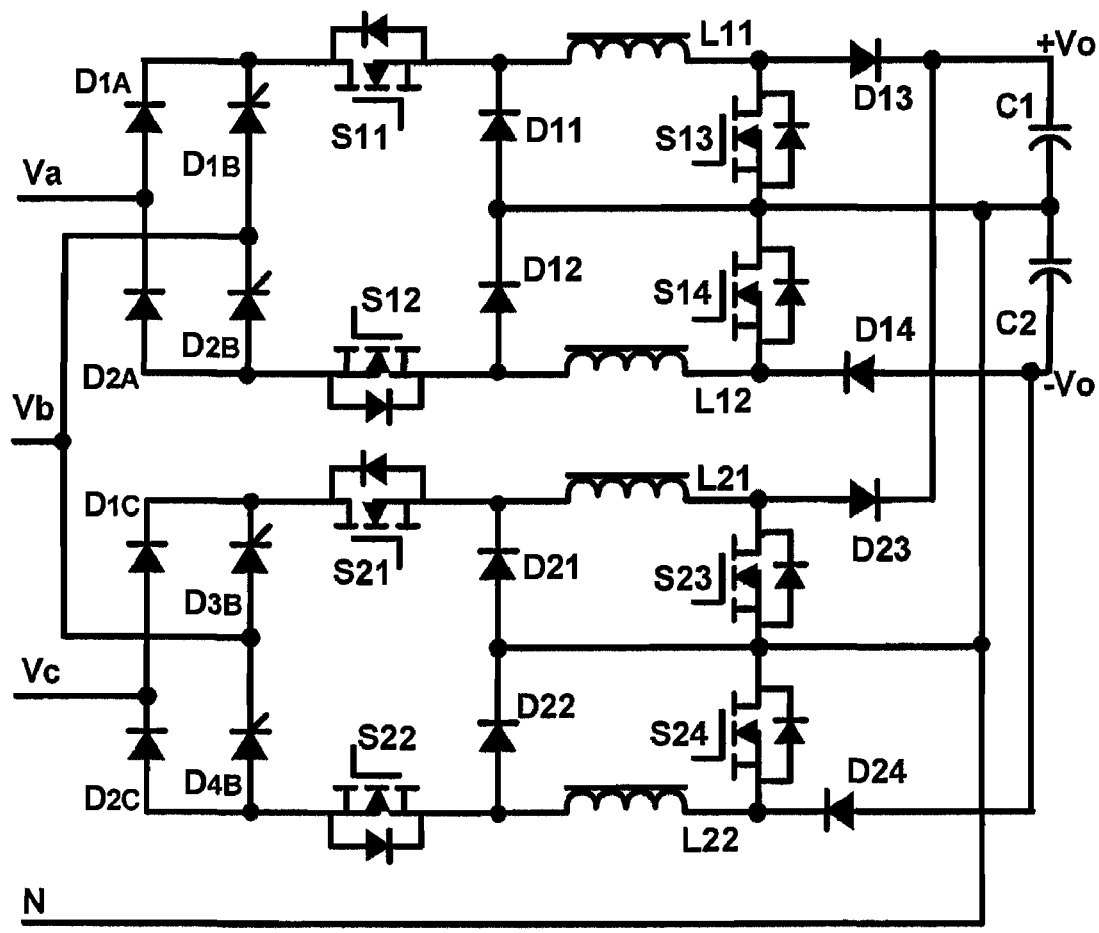
FIG. 8 shows a circuit diagram of a three-phase four-line buck-boost PFC circuit according to the second preferred embodiment of the present invention.

To raise the utilization rate of the elements, and to decrease the quantity of system's elements and costs, the present invention provides another three-phase buck-boost PFC circuit as shown in FIG. 8.

Observing from FIG. 8, the three-phase input voltage is converted by two single-phase buck-boost PFC modes. D1A, D2A, D1C and D2C are diodes, wherein D1A and D2A are used for rectifying the current of phase A, and D1C and D2C are used for rectifying the current of phase C. D1B, D2B, D3B and D4B are thyristors using for rectifying the current of phase B. S11, S12, S13, S14, S21, S22, S23 and S24 are power switches, engage in chopping according to the required duty ratio, and cause the system to output the required voltage. In this kind of integrated circuit, the thyristors accomplish the rectifying function and achieve the switching function too. The detail working principles are described as the following descriptions.

$$0 \sim \frac{\pi}{6} \text{ working region} \tag{1}$$

Figure 9:
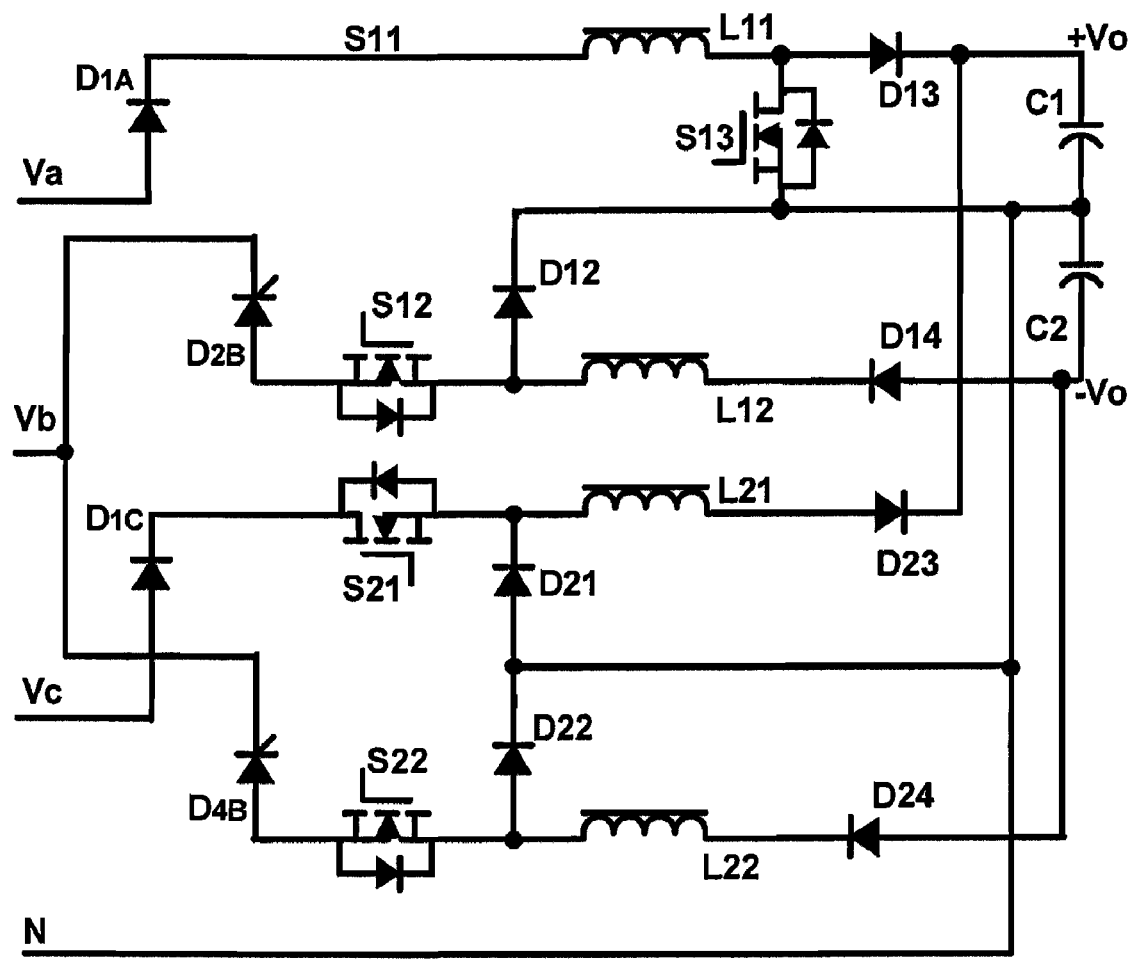
FIGS. 9-20 respectively show a circuit diagram of the working modes 1 to 12 of the three-phase four-line buck-boost PFC circuit according to the second preferred embodiment of the present invention.

Referring to FIG. 9, it shows the working mode 1 in the first working region. Phase A voltage is larger than zero and the amplitude of which is smaller than the output voltage in the first region, thus diode D1A is turned on, phase A voltage is implemented in the boost mode, switch S11 is turned on, diode D11 is turned off, switch S13 is chopping towards the phase A voltage, and inductor L11 is used in charging and discharging of the phase A voltage. When switch S13 is turned on, current of phase A flows through sub-circuit of Va->D1A->S11-xL11->S13->N and charges inductor L11. When switch S13 is turned off, current of phase A flows through sub-circuit of Va->D1A->S11->L11->D13->C1->N and charges capacitor C1. Phase C voltage is larger than zero and the amplitude of which is larger than the output voltage in the first region, thus diode D1C is turned on, phase C voltage is implemented in the buck mode, switch S23 is turned off, diode D23 is turned on, switch S21 is chopping towards the phase C voltage, and inductor L21 is used in charging and discharging of the phase C voltage. When switch S21 is turned on, current of phase C flows through sub-circuit of Vc->D1C->S21->L21->D23->C1->N and charges inductor L21. When switch S21 is turned off, current of phase C flows through sub-circuit of D21->L21->D23->C1->N, and inductor L21 releases energy. Phase B voltage is less than zero and the amplitude of which is larger than the output voltage in the first region, thus current of phase B is in buck mode. Through the above-mentioned analyses, one would know that switches S12 and S22 are not taking effect towards phase A and phase C, we could use switches S1 2 and S22 to proceed buck mode control towards current of phase B, switches S14 and S24 turn off and diodes D23 and D24 turn on at this moment. Inductors L12 and L22 are used in charging and discharging of the phase B voltage. Especially as illustrated, we could use only switch S12 to engage chopping towards phase B voltage in this region, diode D2B turns on, and diode D4B turns off at this moment. When switch S12 is turned on, current of phase B flows through sub-circuit of N->C2->D14->L12->S12->D2B->Vb and charges inductor L12. When switch S12 turns off, current of phase B flows through sub-circuit of C2->D14->L12->D12, and inductor L12 releases energy. We could also use only switch S22 to engage chopping towards phase B voltage in this region, diode D4B turns on, and diode D2B turns off at this moment. When switch S22 turns on, current of phase B flows through sub-circuit of N->C2->D24->L22->S22->D4B->Vb and charges inductor L22. When switch S22 turns off, current of phase B flows through sub-circuit of C2->D24->L22->D22 and inductor L22 releases energy. We could also use switches S12 and S22 commonly operated and chopping towards current of phase B, both thyristors D2B and D4B turn on, and current of phase B flows into two sub-circuits.

The working principles of the remaining regions are similar to those of region 1, and would not be described in detail. The respective simplified topology of the working mode of the converter of each region is shown as follows.

$$\frac{\pi}{6} \sim \frac{\pi}{3} \text{ working region} \tag{2}$$

Figure 10:
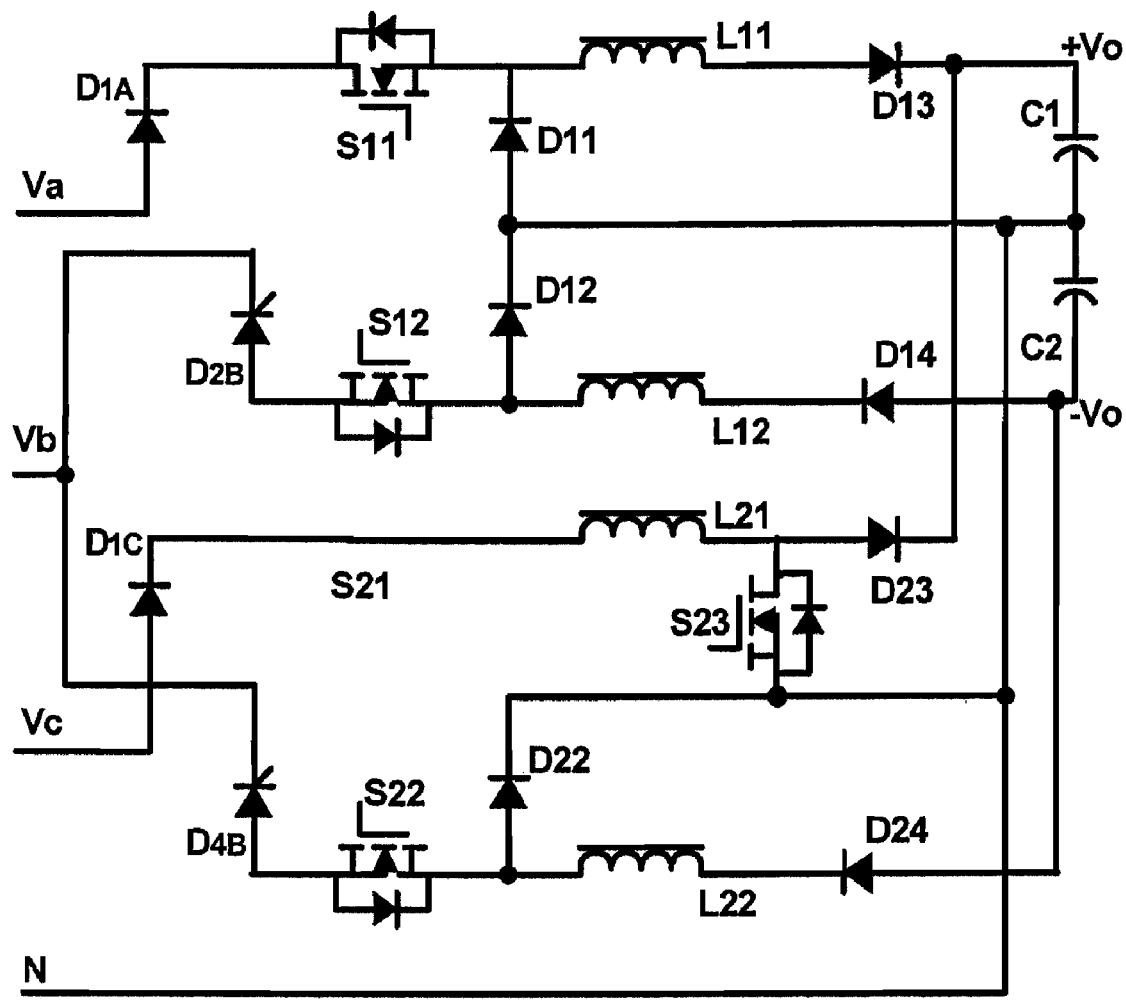

Similarly, referring to FIG. 10, it shows the working mode 2 in the second working region.

$$\frac{\pi}{3} \sim \frac{\pi}{2} \text{ working region} \tag{3}$$

Figure 11:
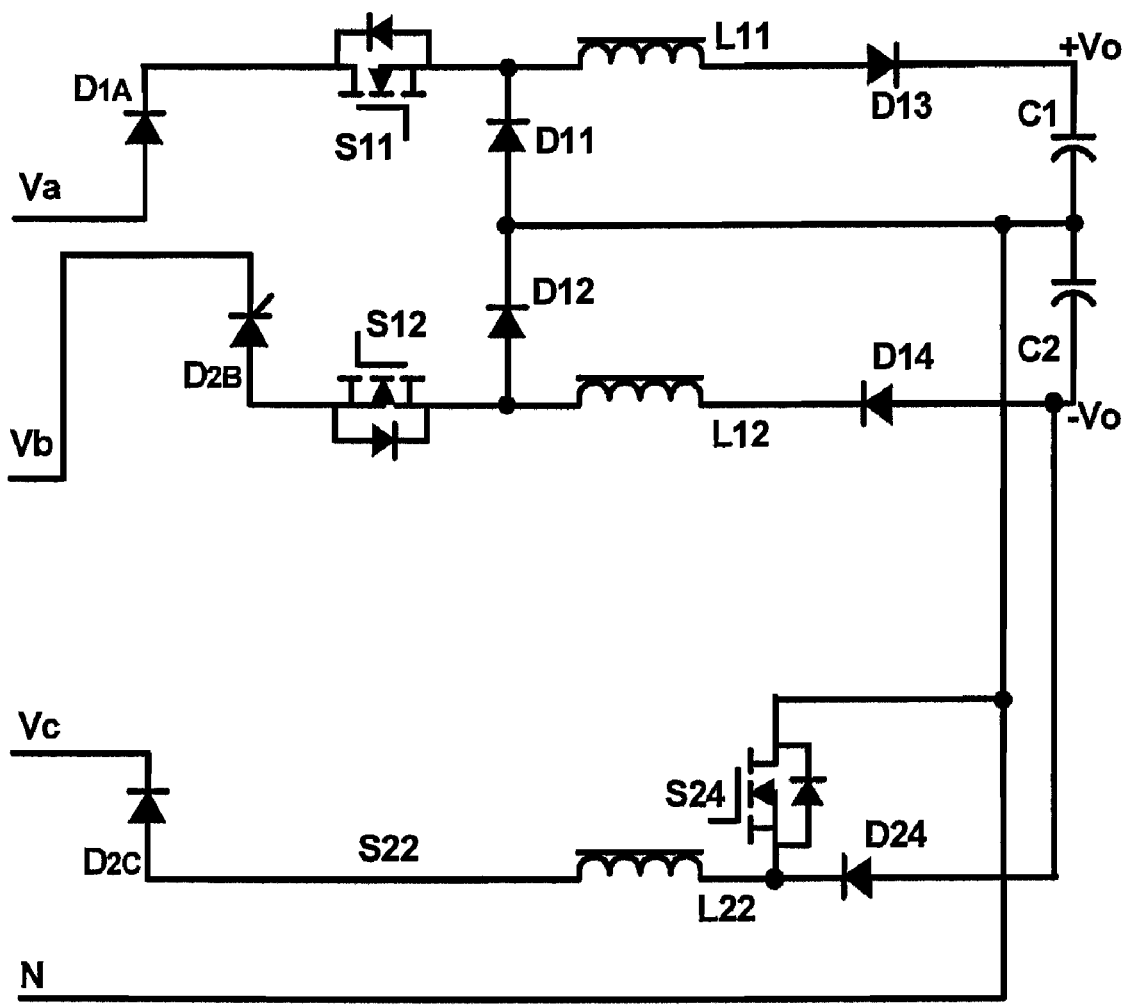

Referring to FIG. 11, it shows the working mode 3 locating at the third working region.

$$\frac{\pi}{2} \sim \frac{2\pi}{3} \text{ working region} \tag{4}$$

Figure 12:
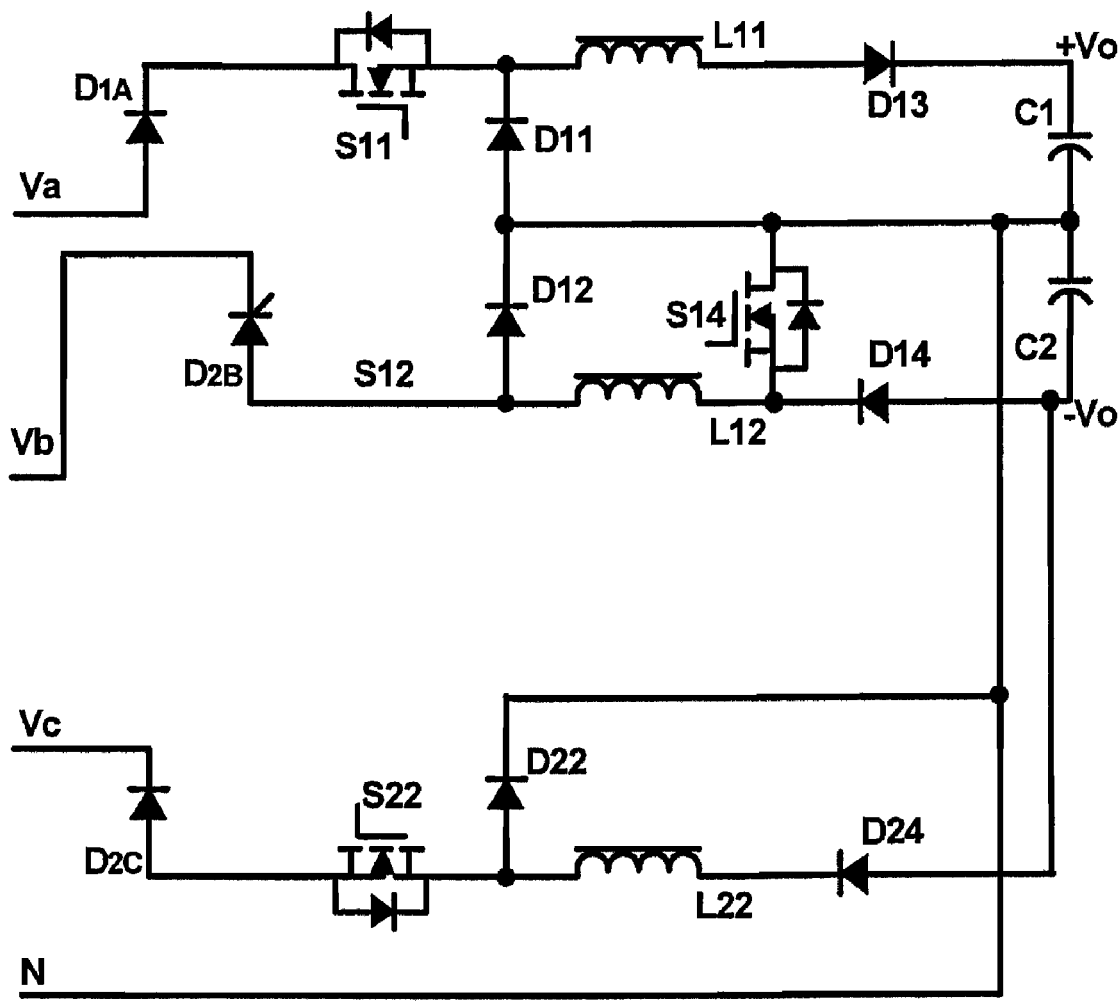

Referring to FIG. 12, it shows the working mode 4 in the fourth working region.

$$\frac{2\pi}{3} \sim \frac{5\pi}{6} \text{ working region} \quad (5)$$

Figure 13:
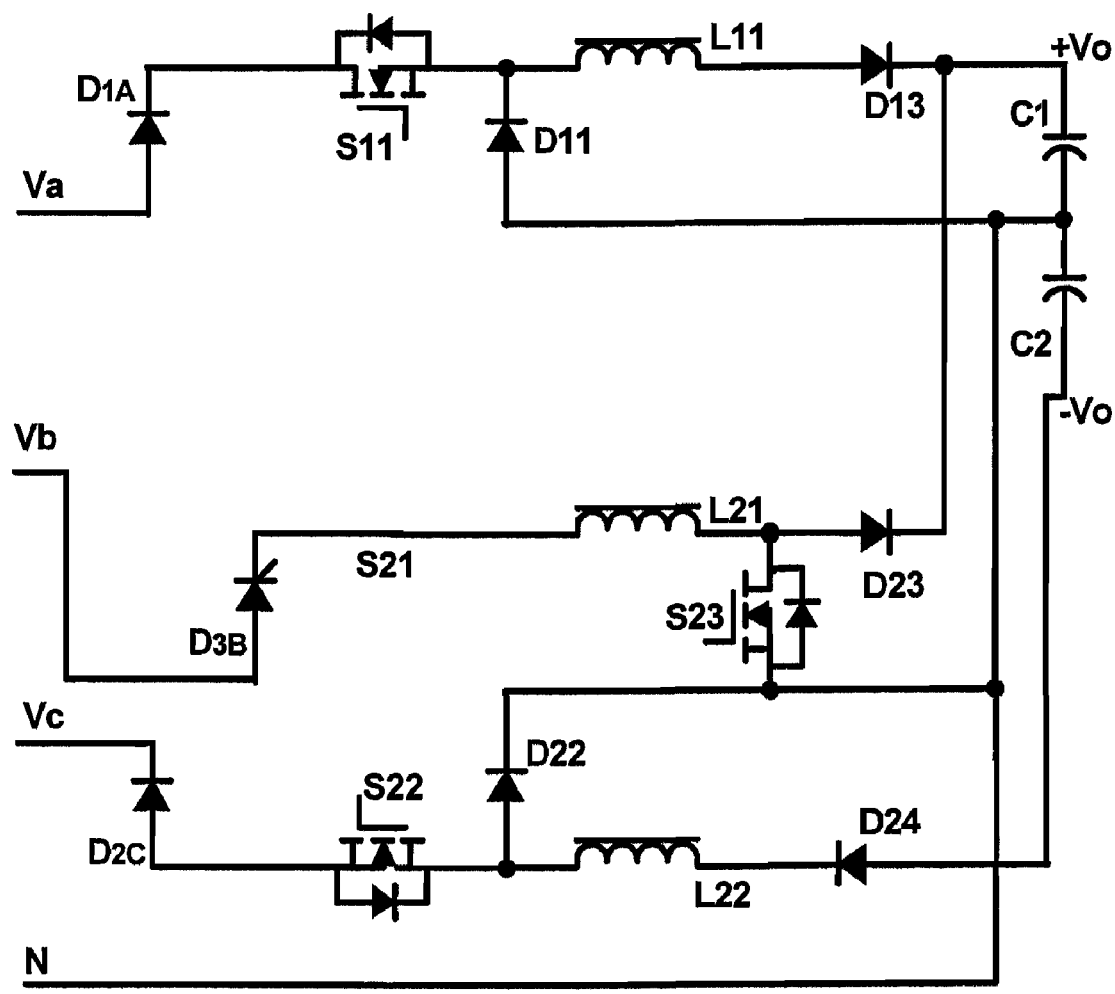

Referring to FIG. 13, it shows the working mode 5 in the fifth working region.

$$\frac{5\pi}{6} \sim \pi \text{ working region} \quad (6)$$

Figure 14:
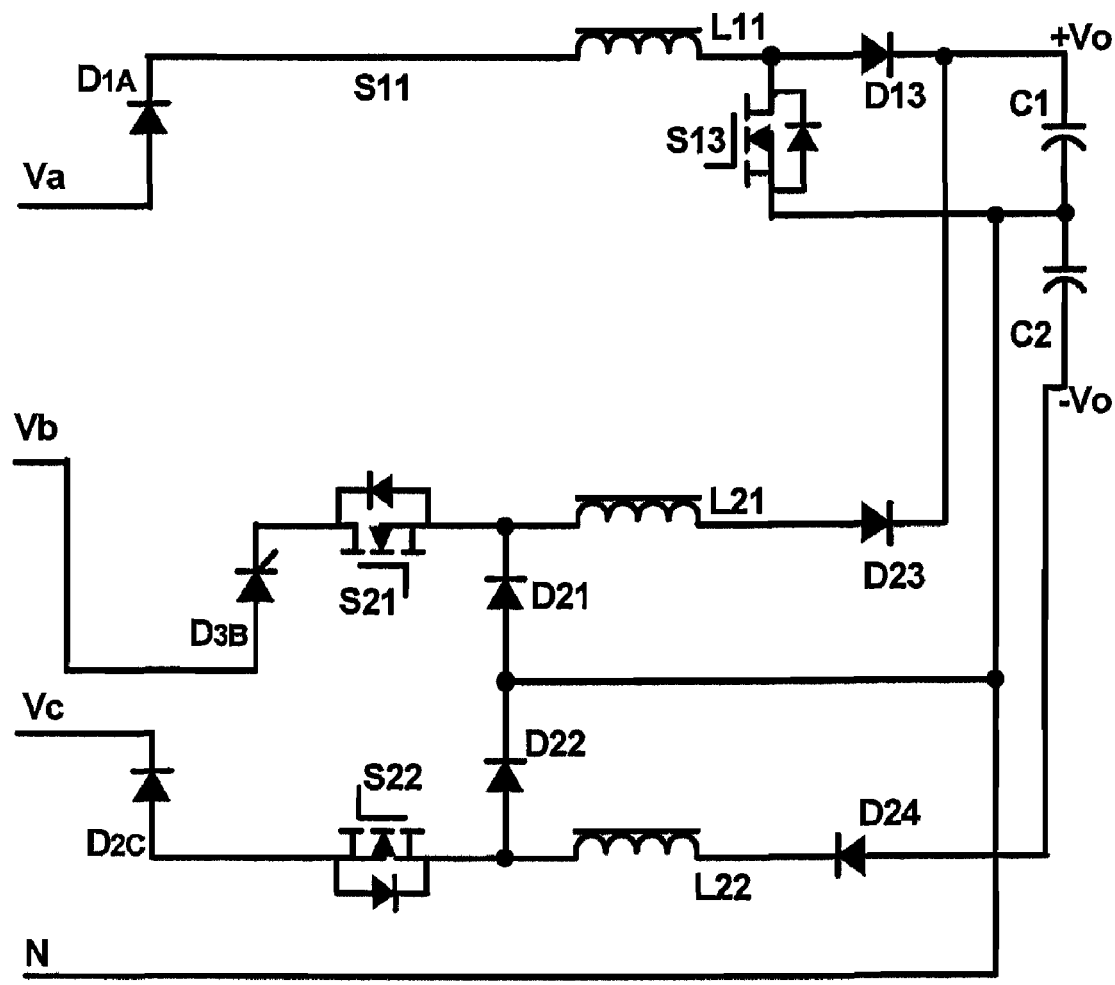

Similarly, referring to FIG. 14, it shows the working mode 6 in the sixth working region.

$$\pi \sim \frac{7\pi}{6} \text{ working region} \quad (7)$$

Figure 15:
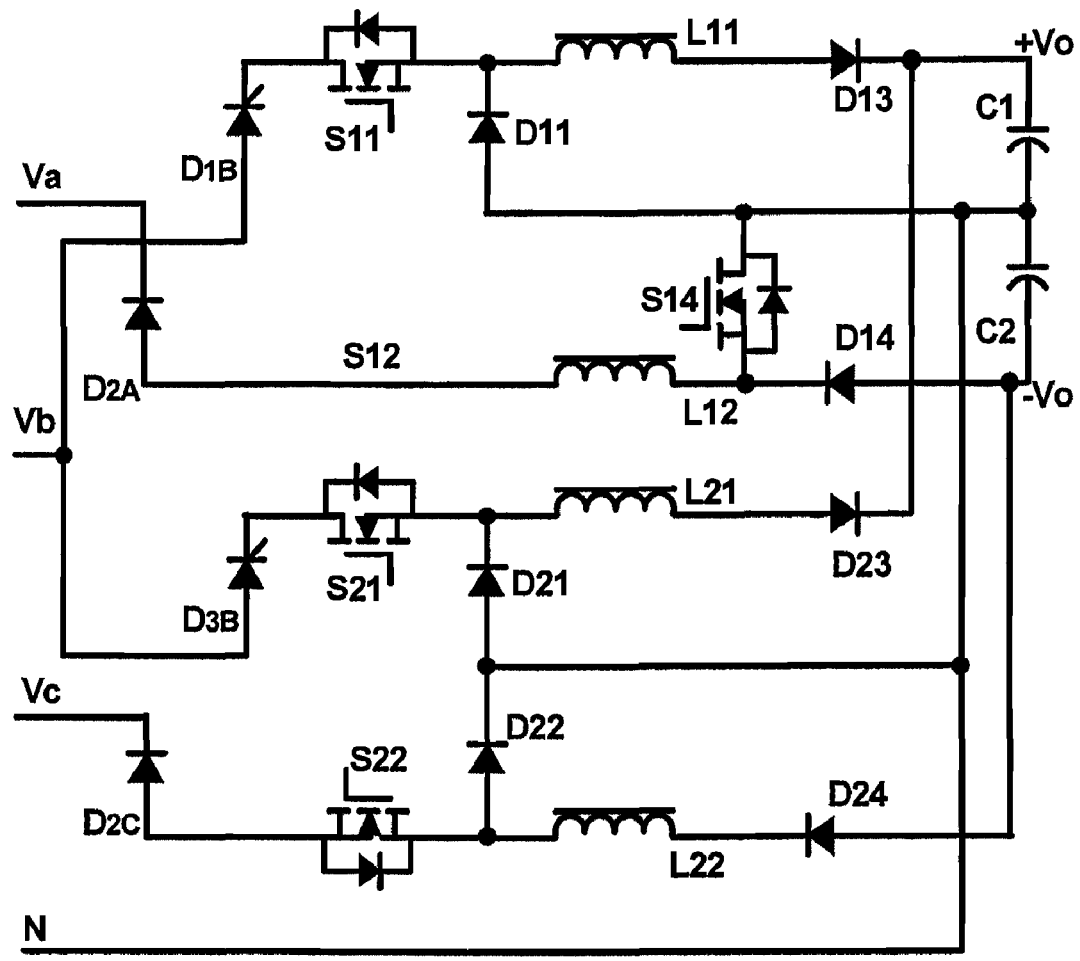

And then, referring to FIG. 15, it shows the working mode 7 in the seventh working region.

$$\frac{7\pi}{6} \sim \frac{4\pi}{3} \text{ working region} \quad (8)$$

Figure 16:
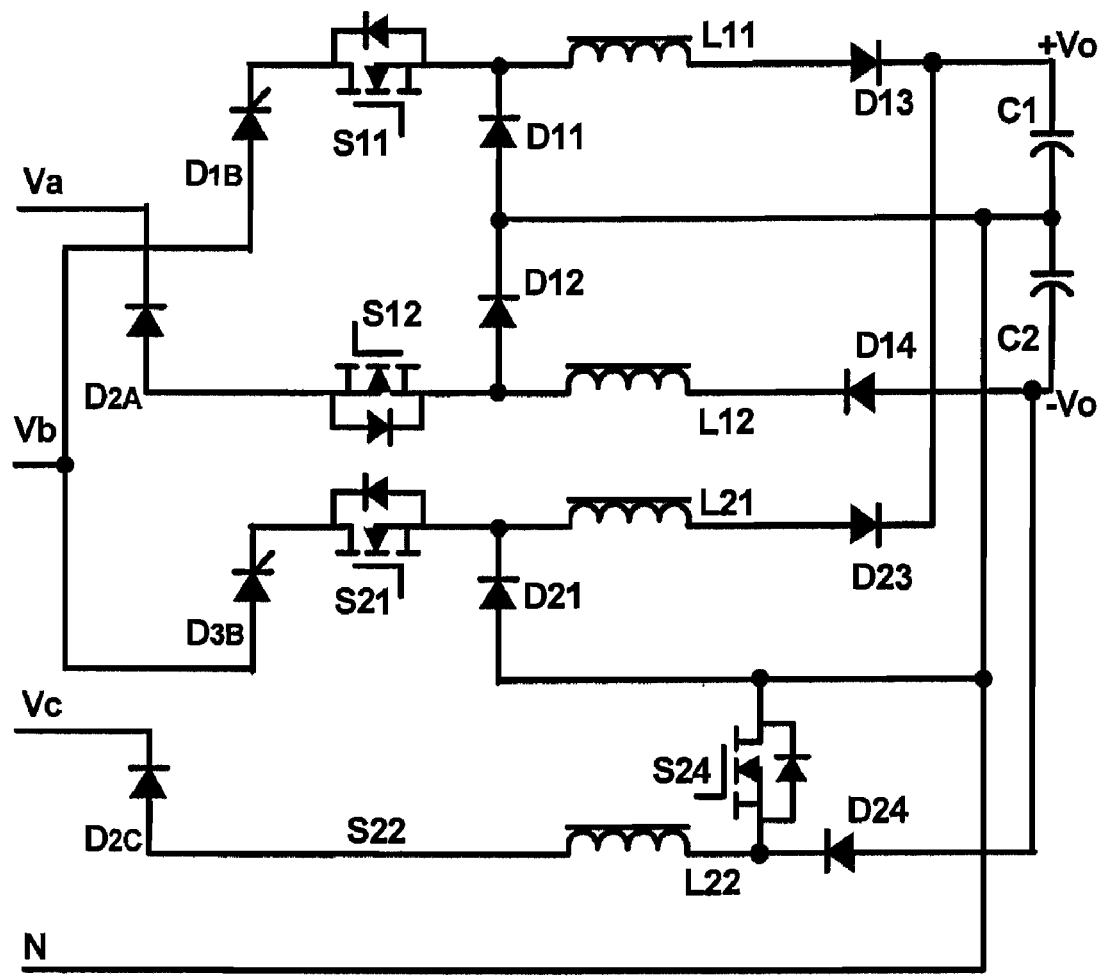

As for the working mode 8 in the eighth working region, it is shown in FIG. 16.

$$\frac{4\pi}{3} \sim \frac{3\pi}{2} \text{ working region} \quad (9)$$

Figure 17:
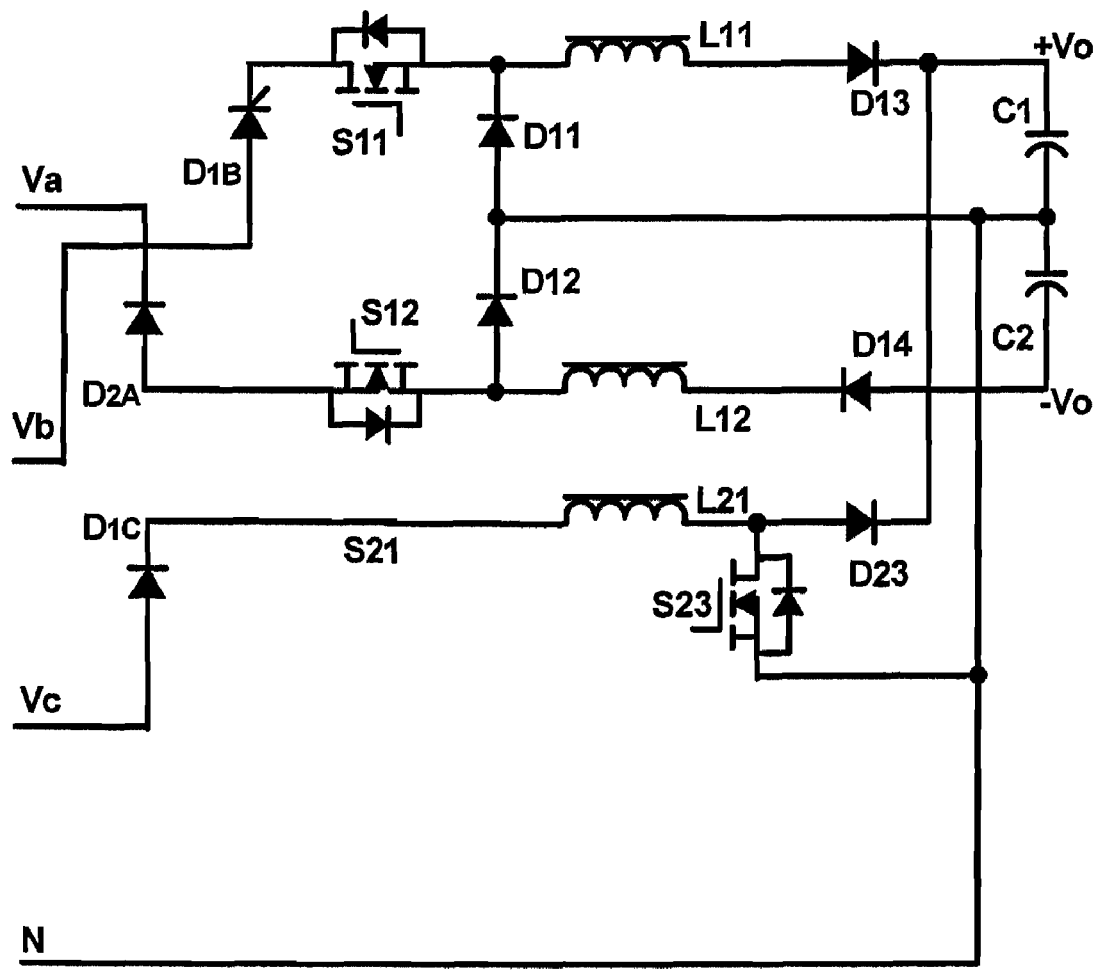

As for the working mode 9 locating at the ninth working region, it is shown in FIG. 17.

$$\frac{3\pi}{2} \sim \frac{5\pi}{3} \text{ working region} \quad (10)$$

Figure 18:
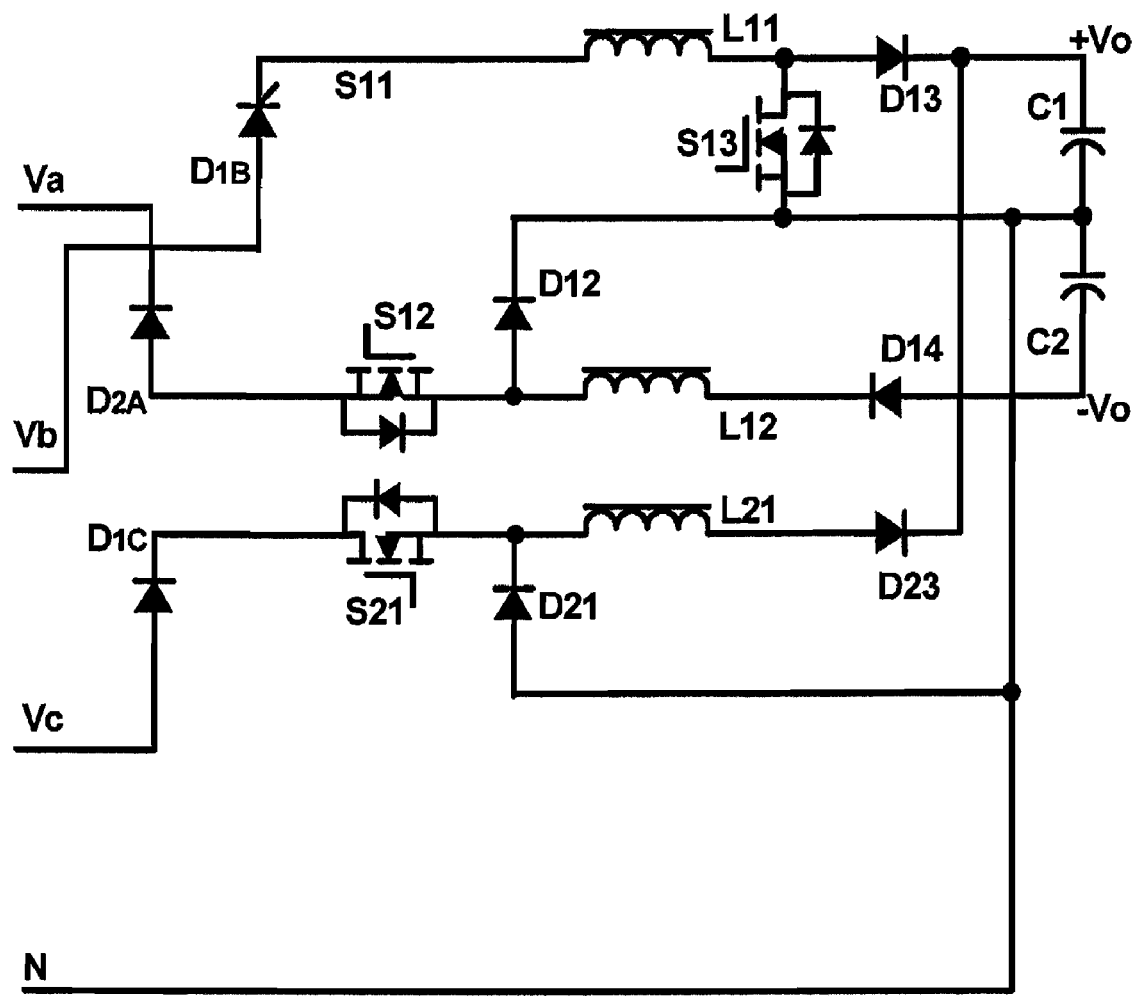

As shown in FIG. 18, it is the working mode 10 of its tenth working region.

$$\frac{5\pi}{3} \sim \frac{11\pi}{6} \text{ working region} \quad (11)$$

Figure 19:
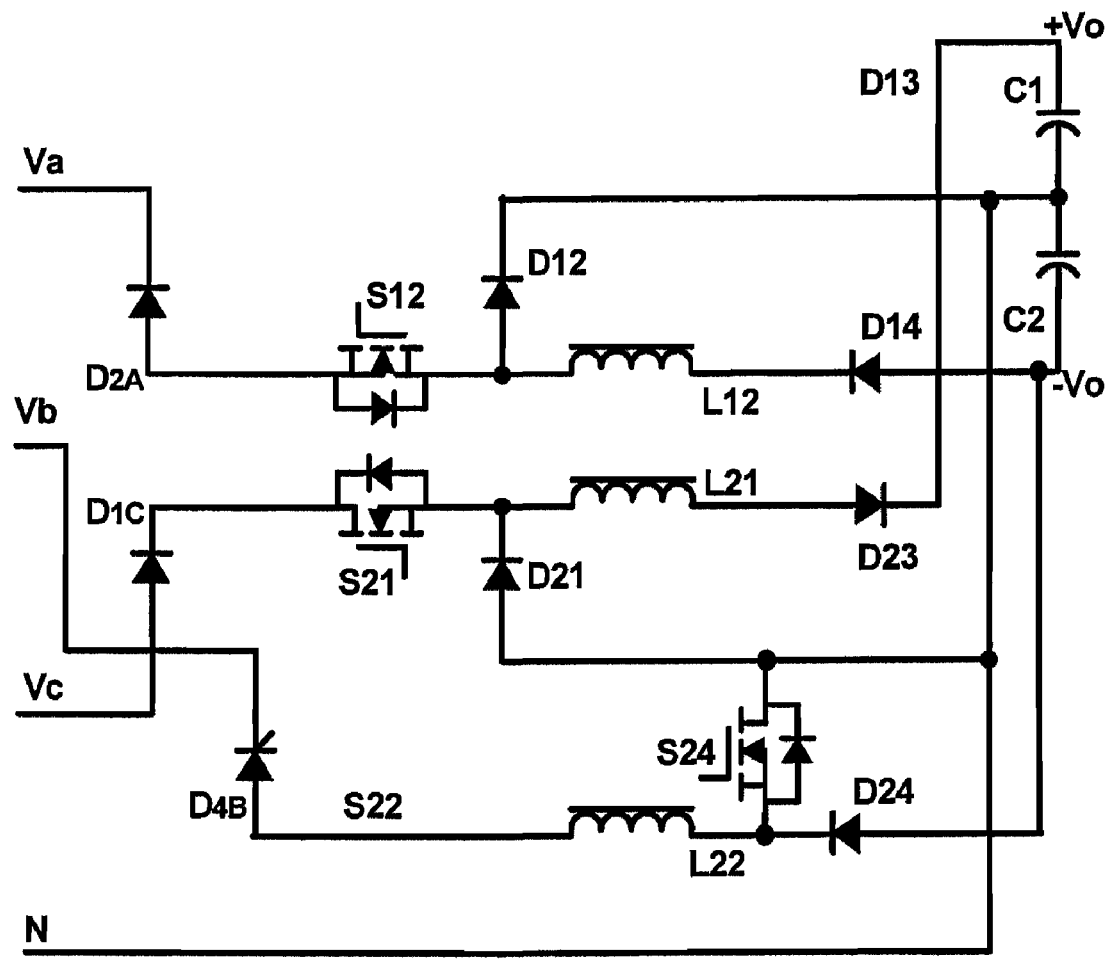

The working mode 11 in the eleventh working region is shown in FIG. 19.

$$\frac{11\pi}{6} \sim 2\pi \text{ working region} \quad (12)$$

Figure 20:
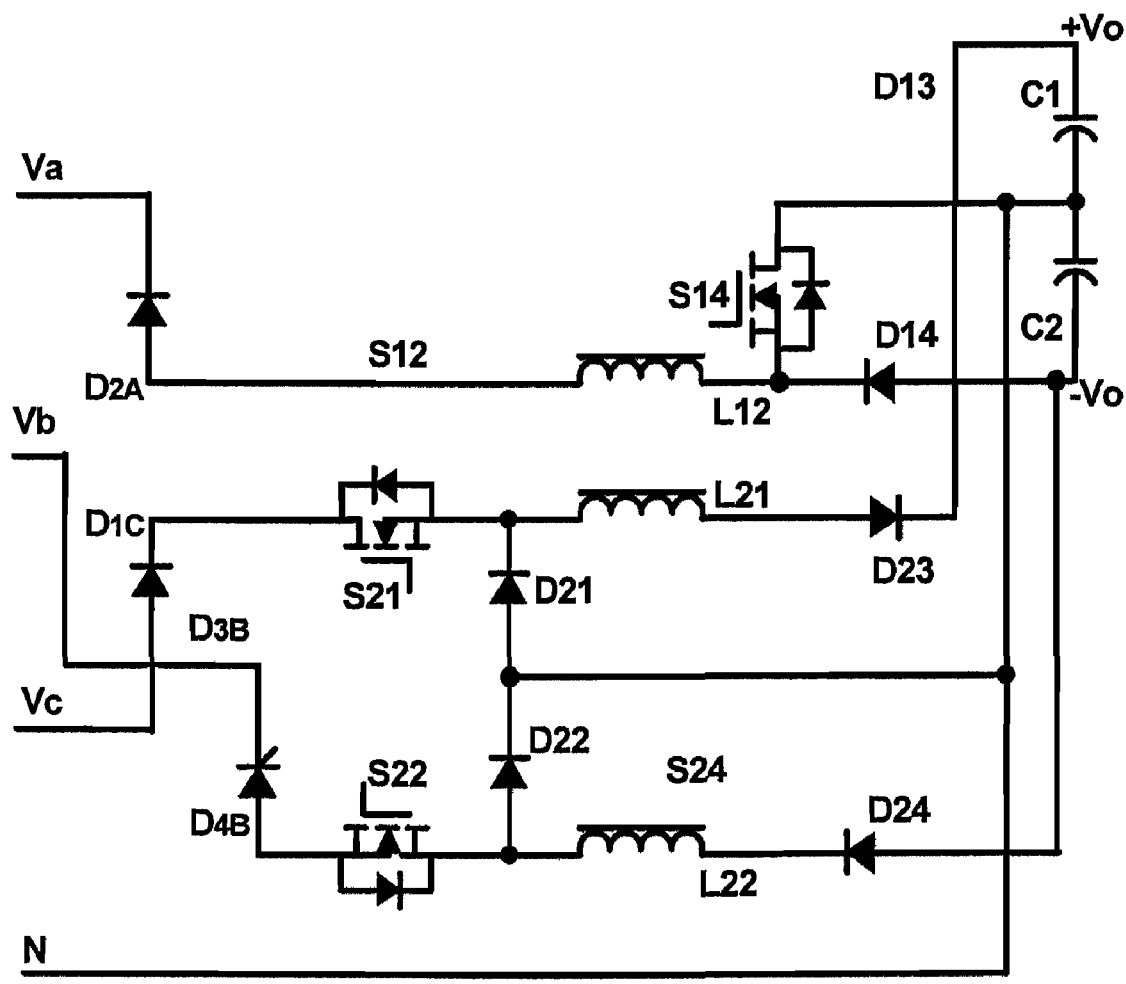

Regarding the working mode 12 in the twelfth working region, it is shown in FIG. 20.

Observing from the aforementioned analyses, the present invention has the following features:

1. Having three-phase buck-boost PFC function, low THD and high efficiency; and
2. The improved buck-boost PFC circuit only employing two single-phase buck-boost PFC circuits to rectify the three-phase input voltage so as to decrease the quantity of system's elements, increase the utilization rate of the elements, increase the system's power density at the same time and decrease the system's costs;
3. Controlling each phase current independently so as to accomplish the parallel-connected system easily; and
4. Accomplishing the integrated circuit of PFC circuit and DC/DC converter easily, especially suitable for occasions of UPS, and described in detail according to the following preferred embodiments.

The third to the fifth preferred embodiments of the present invention are described as follows.

Figure 21:
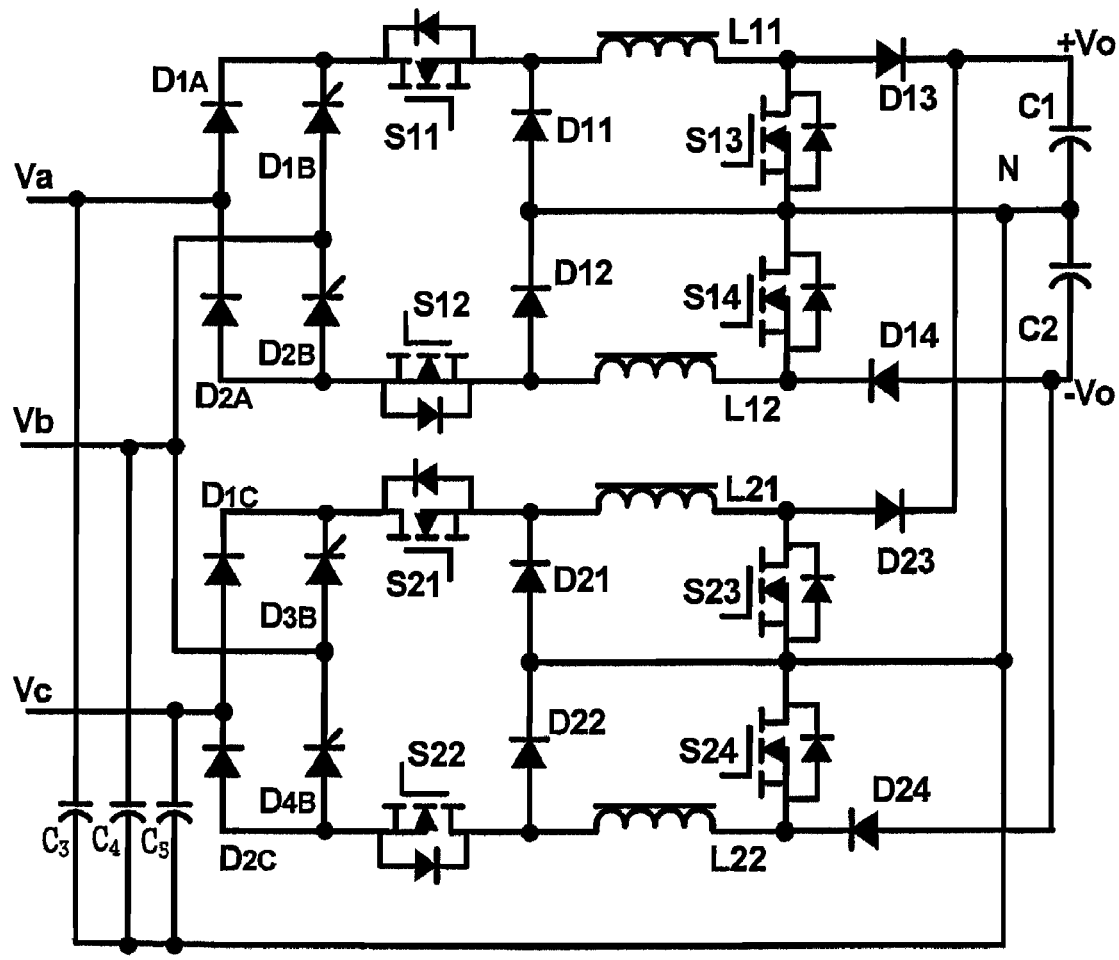
FIG. 21 shows a circuit diagram of a three-phase four-line buck-boost PFC circuit according to the third preferred embodiment of the present invention.

The above-mentioned analyses towards the circuit are all using circuit of FIG. 8 as example, and the three-phase AC power source is the three-phase four-line type. But in the real application, if the three-phase AC power source is the three-phase three-line type, then three capacitors having Y-type connection C3-C5 are employed to form a floating neutral point at the input terminal so as to change the three-phase three-line type into a three-phase four-line type as shown in FIG. 21. In which, N is the formed neutral point, and this belongs to the scope of the third preferred embodiment of the present invention.

Figure 22:
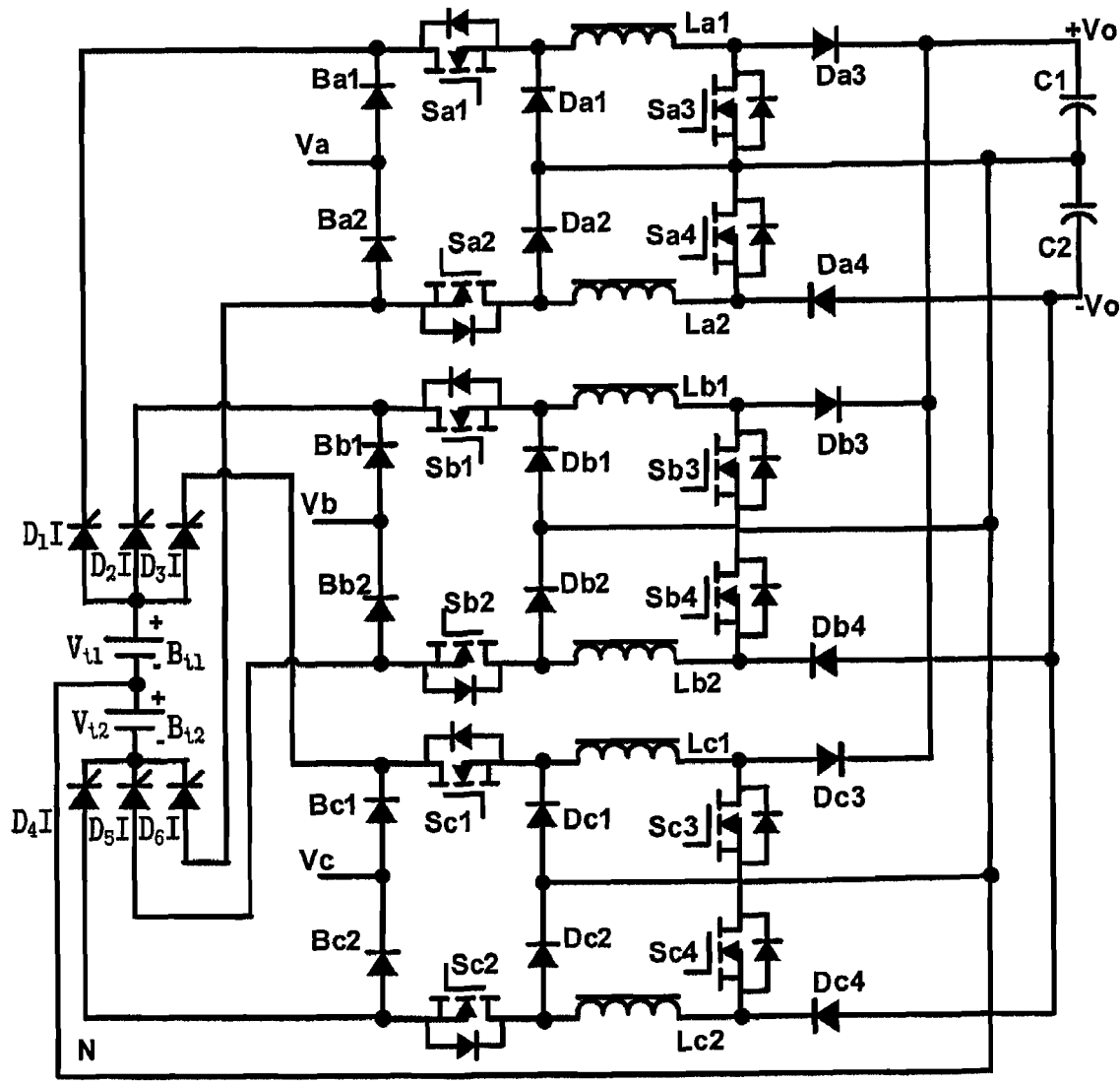
FIG. 22 shows a circuit diagram of a three-phase four-line buck-boost PFC circuit according to the fourth preferred embodiment of the present invention.

When the input voltage is cut off, we need to use the battery to provide the electrical power to the system continuously to guarantee the normal operation of the system. FIG. 22 shows a mode having two sets of batteries Bi1 and Bi2 through six thyristors D11 to D61 and a neutral line N being electrically connected to the three single-phase buck-boost PFC circuits, the two set of batteries Bi1 and Bi2 respectively provide the electrical power to the positive-half cycle and the negative-half cycle of the three-phase four-line mode, and this belongs to the scope of the fourth preferred embodiment of the present invention.

Figure 23:
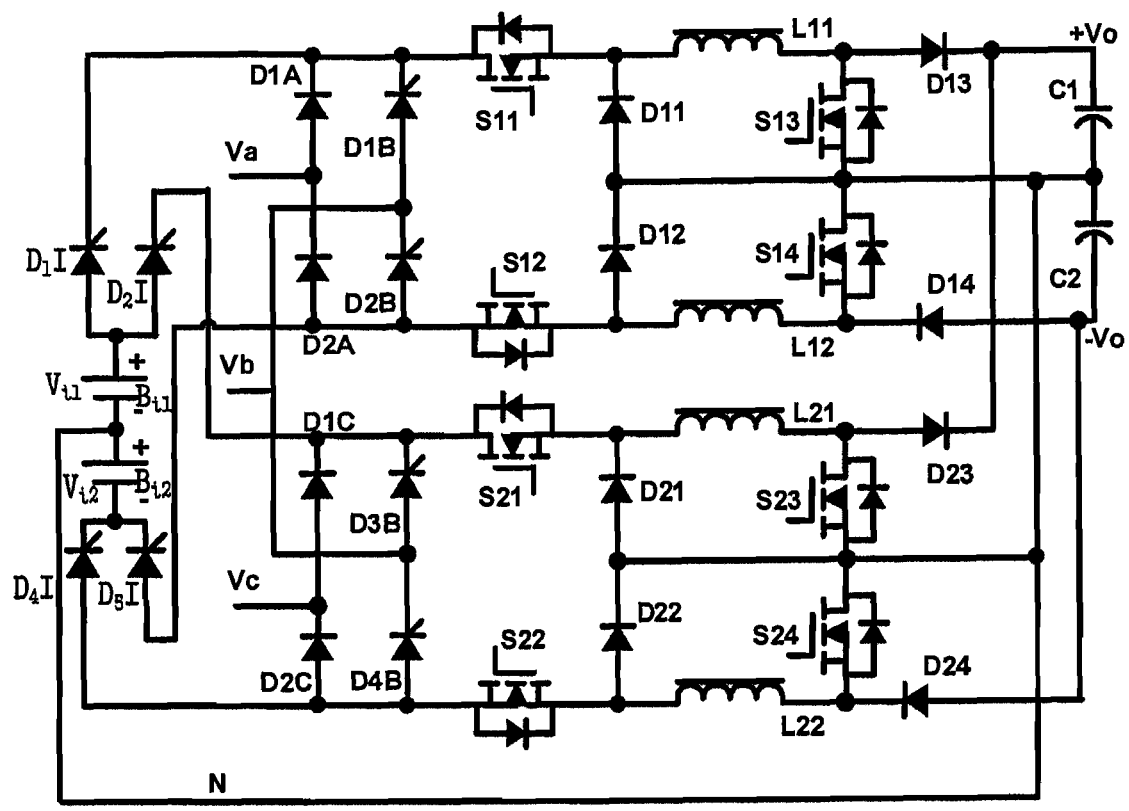
FIG. 23 shows a circuit diagram of a three-phase four-line buck-boost PFC circuit according to the fifth preferred embodiment of the present invention.

FIG. 23 shows a mode having two sets of batteries Bi1 and Bi2 through four thyristors D11-D21 and D41-D51, and a neutral line N being electrically connected to the two single-phase buck-boost PFC circuits, the two set of batteries Bi1 and Bi2 respectively provide the electrical power to the positive-half cycle and the negative-half cycle of the three-phase four-line mode, and this belongs to the scope of the fifth preferred embodiment of the present invention.

Thus, the aforementioned several topologies as shown in FIGS. 21 to 23 are also belonging to the scope of the preferred embodiments of the present invention.

According to the aforementioned descriptions, the present invention provides a three-phase buck-boost PFC circuit and a controlling method thereof, this circuit includes three independent single-phase three-level buck-boost PFC circuit, the first, the second and the third single-phase three-level buck-boost PFC circuit would not influence each other due to having a neutral line, operate independently from each other, could be used to improve the THD of the three-phase buck-boost PFC circuit and to increase the efficiency of the same. The three-phase buck-boost PFC circuit provided by the present invention relatively has the higher efficiency, decreases the quantity of elements, raises the utilization ratio of elements and the power density of the system at the same time, and decrease costs of the system. Besides, it has the advantages of being easy to realize the parallel-connected system, the integrated circuit of the PFC circuit and the DC/DC converter, and it is especially suitable for the UPS due to that each phase current is independently controlled, which indeed possesses the non-obviousness and the novelty.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A three-phase buck-boost power factor correction (PFC) circuit, comprising:
    a first single-phase buck-boost PFC circuit receiving a first phase voltage of a three-phase voltage and having a first and a second output terminals and a neutral-point for outputting a first and a second output voltages;
    a second single-phase buck-boost PFC circuit receiving a third phase voltage of the three-phase voltage and coupled to the first and the second output terminals and the neutral-point;
    a first to a fourth thyristors, each of which has an anode and a cathode, wherein the anodes of the first and the third thyristors and the cathodes of the second and the fourth thyristors receive a second phase voltage of the three-phase voltage, the cathode of the first thyristor and the anode of the second thyristor are coupled to the first single-phase buck-boost PFC circuit, and the cathode of the third thyristor and the anode of the fourth thyristor are coupled to the second single-phase buck-boost PFC circuit;
    a first output capacitor coupled to the first output terminal and the neutral-point;
    a second output capacitor coupled to the neutral-point and the second output terminal; and
    a neutral line coupled to the neutral-point.

2. A circuit according to claim 1, wherein each of the first and the second single-phase buck-boost PFC circuits is a single-phase three-level buck-boost PFC circuit, and each the single-phase three-level buck-boost PFC circuit further comprises:
    a first to a sixth diodes, each of which has an anode and a cathode, wherein the first and the second diodes are used in rectification, the anode of the first diode is coupled to the cathode of the second diode, and the cathode of the fourth diode is coupled to the anode of the third diode;
    a first to a fourth switches, each of which has a first and a second terminals, wherein the first terminal of the first switch is coupled to the cathode of the third diode, the second terminal of the first switch is coupled to the cathode of the first diode, the first terminal of the second switch is coupled to the anode of the second diode, the second terminal of the second switch is coupled to the anode of the fourth diode, the first terminal of the third switch is coupled to the cathode of the fourth diode, the second terminal of the third switch is coupled to the anode of the fifth diode, the first terminal of the fourth switch is coupled to the cathode of the sixth diode, the second terminal of the fourth switch is coupled to the first terminal of the third switch, the cathode of the fifth diode is coupled to the first output terminal, the anode of the sixth diode is coupled to the second output terminal, and the neutral point is coupled to the first terminal of the third switch; and
    a first and a second inductors, each of which has a first and a second terminals, wherein the first terminal of the first inductor is coupled to the cathode of the third diode, the second terminal of the first inductor is coupled to the second terminal of the third switch, the first terminal of the second inductor is coupled to the anode of the fourth diode, and the second terminal of the second inductor is coupled to the first terminal of the fourth switch.

3. A circuit according to claim 1 further comprising a first to a third input capacitors, wherein each the input capacitor and the neutral line have a first and a second terminals, the second terminal of the neutral line is coupled to the neutral point, the first terminal of the first input capacitor receives the first phase voltage, the second terminal of the first input capacitor is coupled to the first terminal of the neutral line, the first terminal of the second input capacitor receives the second phase voltage, the second terminal of the second input capacitor is coupled to the second terminal of the first input capacitor, the first terminal of the third input capacitor receives the third phase voltage, and the second terminal of the third input capacitor is coupled to the second terminal of the second input capacitor.

4. A circuit according to claim 1 further comprising a fifth to a eighth thyristors and a first and a second batteries, wherein each the thyristor has an anode and a cathode, each the battery has a positive and a negative terminals, the neutral line has a first and a second terminals, the second terminal of the neutral line is coupled to the neutral point, the anodes of the fifth and the sixth thyristors are coupled to the positive terminal of the first battery, the cathodes of the fifth and the sixth thyristors are respectively coupled to the cathodes of the first diodes of the first and the second single-phase buck-boost PFC circuits, the positive terminal of the second battery is coupled to the negative terminal of the first battery, the cathodes of the seventh and the eighth thyristors are coupled to the negative terminal of the second battery, the anodes of the seventh to the eighth thyristors are respectively coupled to the anodes of the second diodes of the second and the first single-phase buck-boost PFC circuits, and the positive terminal of the second battery is coupled to the first terminal of the neutral line.

* * * * *